United States Patent
Seo et al.

(10) Patent No.: US 9,979,513 B2
(45) Date of Patent: *May 22, 2018

(54) METHOD AND DEVICE FOR EXECUTING HARQ IN TDD-BASED WIRELESS COMMUNICATION SYSTEM

(71) Applicant: LG ELECTRONICS INC., Seoul (KR)

(72) Inventors: Dong Youn Seo, Anyang-si (KR); Min Gyu Kim, Anyang-si (KR); Han Byul Seo, Anyang-si (KR); Joon Kui Ahn, Anyang-si (KR); Suck Chel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/619,665

(22) Filed: Jun. 12, 2017

(65) Prior Publication Data

US 2017/0279563 A1 Sep. 28, 2017

Related U.S. Application Data

(63) Continuation of application No. 15/200,304, filed on Jul. 1, 2016, now Pat. No. 9,705,642, which is a
(Continued)

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/1822* (2013.01); *H04L 1/1864* (2013.01);
(Continued)

(58) Field of Classification Search
CPC ......... H04L 5/14; H04L 5/001; H04L 5/0055; H04L 1/1822; H04L 1/1893; H04L 1/18;
(Continued)

(56) References Cited

U.S. PATENT DOCUMENTS 8,837,440 B2 9/2014 Feng et al.
8,848,569 B2 9/2014 Wang et al.
(Continued)

FOREIGN PATENT DOCUMENTS

| KR | 10-2011-0007585 A | 1/2011 |
| WO | WO 2011/005032 A2 | 1/2011 |
| WO | WO 2012/124958 A2 | 9/2012 |

OTHER PUBLICATIONS

3GPP TSG-RAN WG1 Meeting #54bis, R1-083730, "L1 control signaling with carrier aggregation in LTE-Advanced", Nokia, Nokia Siemens Networks, Sep. 29-Oct. 3, 2008, pp. 1-7.
(Continued)

*Primary Examiner* — Benjamin H Elliott, IV
(74) *Attorney, Agent, or Firm* — Birch, Stewart, Kolasch & Birch, LLP

(57) ABSTRACT

A method is provided for performing a hybrid automatic repeat request (HARQ) by a user equipment (UE). An uplink (UL) grant for a first subframe of a second serving cell is received through a first serving cell. UL data in the first subframe of the second serving cell is transmitted according to the UL grant. When a not-acknowledgement (NACK) for the UL data is received through a physical HARQ indicator channel (PHICH) in a subframe i of the first serving cell, the UE performs a non-adaptive retransmission for the UL data in a second subframe of the second serving cell. When a PHICH resource corresponding to the UL data is not present in the subframe i, the UE does not perform the non-adaptive retransmission in the second subframe of the second serving cell.

10 Claims, 32 Drawing Sheets

Related U.S. Application Data continuation of application No. 14/924,362, filed on Oct. 27, 2015, now Pat. No. 9,407,416, which is a continuation of application No. 14/006,492, filed as application No. PCT/KR2012/002038 on Mar. 21, 2012, now Pat. No. 9,191,180.

(60) Provisional application No. 61/594,384, filed on Feb. 3, 2012, provisional application No. 61/587,082, filed on Jan. 16, 2012, provisional application No. 61/470,499, filed on Apr. 1, 2011, provisional application No. 61/454,975, filed on Mar. 21, 2011.

(51) Int. Cl.
*H04W 72/12* (2009.01)
*H04L 5/14* (2006.01)
*H04W 72/14* (2009.01)
*H04W 88/08* (2009.01)

(52) U.S. Cl.
CPC .......... *H04L 1/1887* (2013.01); *H04L 1/1893* (2013.01); *H04L 5/001* (2013.01); *H04L 5/0055* (2013.01); *H04L 5/14* (2013.01); *H04W 72/1289* (2013.01); *H04W 72/14* (2013.01); *H04W 88/08* (2013.01)

(58) Field of Classification Search
CPC ... H04L 1/1809; H04L 1/1812; H04L 1/1816; H04L 1/1861; H04L 1/1864
See application file for complete search history.

(56) References Cited

U.S. PATENT DOCUMENTS

| | | | |
|---|---|---|---|
| 8,942,202 | B2 | 1/2015 | Kim et al. |
| 9,136,986 | B2 | 9/2015 | Abrahamsson et al. |
| 9,191,180 | B2 | 11/2015 | Seo et al. |
| 9,407,416 | B2 | 8/2016 | Seo et al. |
| 9,705,642 | B2 * | 7/2017 | Seo ....................... H04L 1/1812 |
| 2009/0249153 | A1 * | 10/2009 | Zhang ................... H04L 1/1887 714/748 |
| 2009/0285122 | A1 | 11/2009 | Onggosanusi et al. |
| 2010/0034163 | A1 | 2/2010 | Damnjanovic et al. |
| 2010/0165939 | A1 | 7/2010 | Lin |
| 2010/0238845 | A1 | 9/2010 | Love et al. |
| 2011/0002276 | A1 | 1/2011 | Chen et al. |
| 2011/0211522 | A1 | 9/2011 | Chung et al. |
| 2011/0310830 | A1 | 12/2011 | Wu et al. |
| 2012/0020310 | A1 | 1/2012 | Ji et al. |
| 2012/0033588 | A1 | 2/2012 | Chung et al. |
| 2012/0113941 | A1 | 5/2012 | Chung et al. |
| 2012/0113946 | A1 | 5/2012 | Seo et al. |
| 2012/0201229 | A1 | 8/2012 | Feng et al. |
| 2012/0207126 | A1 * | 8/2012 | Qu .......................... H04L 5/005 370/330 |
| 2012/0294270 | A1 * | 11/2012 | Yamada ................ H04W 74/02 370/329 |
| 2013/0315135 | A1 | 11/2013 | Lee et al. |
| 2014/0078941 | A1 | 3/2014 | Seo et al. |
| 2014/0334436 | A1 * | 11/2014 | Qu .......................... H04L 5/005 370/330 |
| 2016/0050060 | A1 | 2/2016 | Seo et al. |

OTHER PUBLICATIONS

3GPP TSG-RAN1 #55, R1-084424, "Control Channel Design Issues for Carrier Aggregation in LTE-A", Motorola, Nov. 10-14, 2008, pp. 1-4.

LG Electronics Inc., "Issues on DLACK/NACK in Carrier Aggregation," 3GPP TSG RAN WG1 Meeting #58bis, Agenda Item 7.2.2.2 PHICH, R1-094160, Oct. 12-16, 2009, Miyazaki, Japan, 3 pages.

Motorola, "Introduction of Rel-10 LTE-Advanced features in 36.213", 3GPP TSG-RAN Meeting #62, R1-105111, Aug. 23-27, 2010, pp. 1-83.

Nokia Corporation et al., "LTE Carrier Aggregation Enhancements," 3GPP TSG RAN Meeting #51, Agenda Item 14.1, RP-110451, Mar. 15-18, 2011, Kansas City, USA, 5 pages.

* cited by examiner

METHOD AND DEVICE FOR EXECUTING HARQ IN TDD-BASED WIRELESS COMMUNICATION SYSTEM

CROSS REFERENCE TO RELATED APPLICATIONS

This Application is a Continuation of U.S. patent application Ser. No. 15/200,304 filed on Jul. 1, 2016 (now U.S. Pat. No. 9,705,642 issued on Jul. 11, 2017), which is a Continuation of U.S. patent application Ser. No. 14/924,362 filed on Oct. 27, 2015 (now U.S. Pat. No. 9,407,416 issued on Aug. 2, 2016), which is a Continuation of U.S. patent application Ser. No. 14/006,492 filed on Nov. 27, 2013 (now U.S. Pat. No. 9,191,180 issued on Nov. 17, 2015), which is the National Phase of PCT International Application No. PCT/KR2012/002038 filed on Mar. 21, 2012, which claims the benefit under 35 U.S.C. § 119(e) to U.S. Provisional Application Nos. 61/594,384 filed on Feb. 3, 2012, 61/587,082 filed on Jan. 16, 2012, 61/470,499 filed on Apr. 1, 2011 and 61/454,975 filed on Mar. 21, 2011, all of which are hereby expressly incorporated by reference into the present application.

BACKGROUND OF THE INVENTION

Field of the Invention

The present invention relates to wireless communication, and, more particularly, to a method and apparatus for performing a hybrid automatic repeat request (HARQ) in a wireless communication system based on Time Division Duplex (TDD).

Discussion of the Related Art

Long Term Evolution (LTE) based on 3rd Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUCCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-Advanced (A) that is the evolution of 3GPP LTE is in progress. Technology introduced into 3GPP LTE-A includes a carrier aggregation.

A carrier aggregation uses a plurality of component carriers. A component carrier is defined by the center frequency and a bandwidth. One downlink component carrier or a pair of an uplink component carrier and a downlink component carrier correspond to one cell. It can be said that a terminal being served using a plurality of downlink component carriers is being served from a plurality of serving cells.

In a Time Division Duplex (TDD) system, the same frequency is used in uplink and downlink. Accordingly, one or more DL subframes are associated with an UL subframe. The "association" means that transmission/reception in the DL subframe is associated with transmission/reception in the UL subframe. For example, when a transport block is received in a plurality of DL subframes, a terminal sends HARQ ACK/NACK (hereinafter referred to as ACK/NACK) for the transport block in an UL subframe associated with a plurality of DL subframes. Here, a minimum time is necessary to send the ACK/NACK. This is because the time taken to process the transport block and the time taken to process the ACK/NACK are necessary.

Meanwhile, a plurality of serving cells can be introduced into a TDD system. That is, a plurality of serving cells can be assigned to a terminal. In this case, in the prior art, it was assumed that the same uplink-downlink (UL-DL) configuration was used in all the serving cells. The UL-DL configuration is information indicating whether each subframe within a radio frame used in TDD is an UL subframe or a DL subframe. In the next-generation wireless communication system, however, to use different UL-DL configurations in serving cells is also taken into consideration. In this case, how an HARQ will be performed using what method is problematic.

SUMMARY OF THE INVENTION

An object of the present invention is to provide a method and apparatus for performing an HARQ in a wireless communication system based on Time Division Duplex (TDD).

In an aspect, there is provided a method of performing, by user equipment to which a plurality of serving cells based on Time Division Duplex (TDD) has been allocated, a hybrid automatic repeat request (HARQ). The method includes the steps of receiving an uplink grant for a first subframe of a second serving cell through a first serving cell; sending UL data in the first subframe based on the uplink grant; receiving an acknowledgment/not-acknowledgement (ACK/NACK) signal for the UL data through the first serving cell; and sending retransmission data for the UL data in a second subframe of the second serving cell if the ACK/NACK signal is NACK, wherein the first serving cell and the second serving cell use different UL-DL configurations, and the UL-DL configuration is information on which each subframe within a TDD frame is configured as an UL subframe or a DL subframe.

The first subframe and the second subframe may be subframes that form the same HARQ process.

An HARQ period indicative of a time interval from the first subframe to a subframe right before the second subframe may be a whole number times then HARQ period in the case where one serving cell is allocated to the user equipment.

The first subframe and the second subframe may be subframes configured as UL subframes according to the UL-DL configuration used in the second serving cell.

The user equipment may do not search an UL subframe of the second serving cell, placed between the first subframe and the second subframe, for an uplink grant.

The first serving cell may be a primary cell through which the user equipment performs an initial connection establishment procedure or a connection reestablishment procedure along with a base station.

The second serving cell may be a secondary cell additionally allocated to the user equipment in addition to the primary cell.

In the first serving cell and the second serving cell, independent HARQ processes having a number identical with the number of UL subframes of the second serving cell which are placed in an interval between the first subframe and a subframe right before the second subframe may be performed.

In the first serving cell and the second serving cell, independent HARQ processes having a number identical with the number of valid UL subframes of the second serving cell which are placed in an interval between the first subframe and a subframe right before the second subframe may be performed.

The valid UL subframe may be an UL subframe in which the transmission of the UL data is possible and the transmission of an uplink grant corresponding to the UL data transmission is possible in a subframe in which the uplink grant is transmitted.

In another aspect, there is provided a method of performing, by user equipment to which a plurality of serving cells based on Time Division Duplex (TDD) has been allocated, a hybrid automatic repeat request (HARQ). The method includes the steps of receiving a grant for a first subframe of a second serving cell through a first serving cell; sending data in the first subframe based on the grant; and receiving an acknowledgment/not-acknowledgement (ACK/NACK) signal for the data through the first serving cell, wherein the first serving cell and the second serving cell use different UL-DL configurations, and the UL-DL configuration is information on which each subframe within a TDD frame is configured as an UL subframe or a DL subframe.

A first UL-DL configuration used in the first serving cell or a second UL-DL configuration used in the second serving cell may have the same regression period of an HARQ process.

The first UL-DL configuration and the second UL-DL configuration may have the same DL-UL switch-point periodicity.

In yet another aspect, there is provided a method of performing, by user equipment to which a plurality of serving cells based on Time Division Duplex (TDD) has been allocated, a hybrid automatic repeat request (HARQ). The method includes the steps of receiving an uplink grant for a first subframe of a second serving cell through a first serving cell; sending first UL data in the first subframe based on the uplink grant; receiving an uplink grant for a second subframe of the second serving cell in the first serving cell, the uplink grant for the second subframe comprising information indicative of whether or not the first UL data is to be retransmitted; and sending second UL data in the second subframe based on the uplink grant for the second subframe, wherein the first serving cell and the second serving cell use different UL-DL configurations, and the UL-DL configuration is information on which each subframe within a TDD frame is configured as an UL subframe or a DL subframe, if the information indicative of whether or not the UL data is to be retransmitted indicates retransmission, the second UL data is retransmission data of the first UL data, and if the information indicative of whether or not the UL data is to be retransmitted indicates new transmission, the second UL data is new UL data, and a subframe of the first serving cell in which the uplink grant for the second subframe is received does not include physical hybrid-ARQ indicator channel (PHICH) resources.

In the case of the subframe in which the uplink grant for the second subframe is received in the first serving cell, the user equipment may decode only the uplink grant for the second subframe without attempting to receive a physical hybrid-ARQ indicator channel (PHICH).

UE provided in further yet another aspect includes a Radio Frequency (RF) unit transmitting and receiving radio signals and a processor connected with the RF unit, wherein the processor receives an uplink grant for a first subframe of a second serving cell through a first serving cell, sends UL data in the first subframe based on the uplink grant, receives an acknowledgment/not-acknowledgement (ACK/NACK) signal for the UL data through the first serving cell, and sends retransmission data for the UL data in a second subframe of the second serving cell if the ACK/NACK signal is NACK, wherein the first serving cell and the second serving cell use different UL-DL configurations, and the UL-DL configuration is information on which each subframe within a TDD frame is configured as an UL subframe or a DL subframe, and an HARQ period indicative of an interval between the first subframe and the second subframe is a whole number times an HARQ period in the case where one serving cell is allocated.

A synchronous HARQ can be performed even when each serving cell uses a different UL-DL configuration in a Time Division Duplex (TDD) system including a plurality of serving cells.

DETAILED DESCRIPTION OF THE INVENTION

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
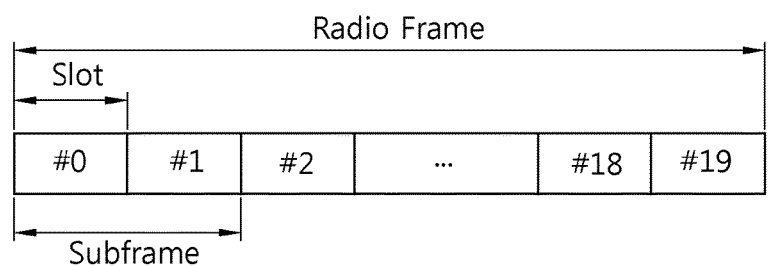
FIG. 1 shows the structure of a radio frame.

FIG. 1 shows the structure of a radio frame.

The radio frame includes 10 subframes, and one subframe includes two consecutive slots. The slots within the radio frame are assigned indices 0-19. The time that is taken for one subframe to be transmitted is called a Transmission Time Interval (TTI). A TTI can be a minimum scheduling unit. For example, the length of one subframe can be 1 ms, and the length of one slot can be 0.5 ms. Such a radio frame can be used in FDD. In this case, this radio frame is called an FDD frame.

Figure 2:
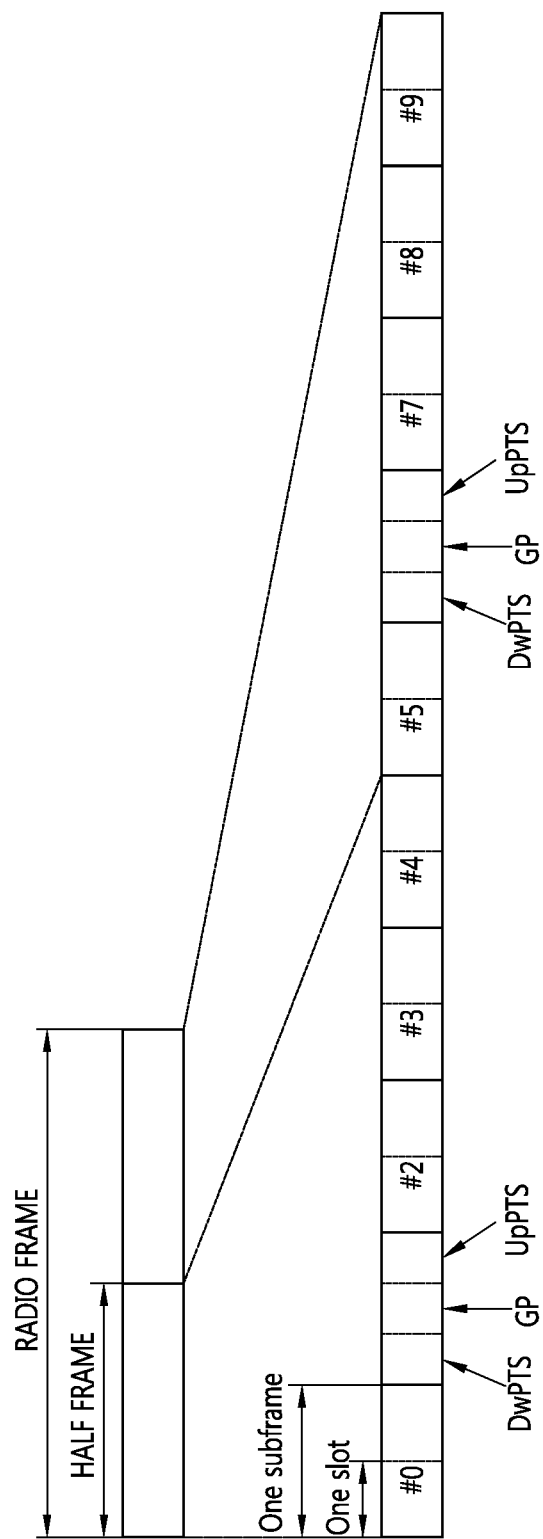
FIG. 2 shows the structure of a TDD radio frame.

FIG. 2 shows the structure of a TDD radio frame.

Referring to FIG. 2, in the TDD radio frame (hereinafter referred to as a TDD frame), subframes having an index #1 and an index #6 are called special subframes, and the subframe includes a Downlink Pilot Time Slot (DwPTS), a Guard Period (GP), and an Uplink Pilot Time Slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed.

In TDD, a downlink (DL) subframe and an uplink (UL) subframe coexist in one radio frame. Table 1 shows an example of the UL-DL configuration of a radio frame.

TABLE 1

| Uplink-downlink configuration | Downlink-to-Uplink Switch-point periodicity | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates an UL subframe, and 'S' indicates a special subframe. When an UL-DL configuration is received from a BS, UE can be aware whether each subframe in a radio frame is a DL subframe or an UL subframe. Hereinafter, reference can be made to Table 1 for an UL-DL configuration N (N is any one of 0 to 6).

Figure 3:
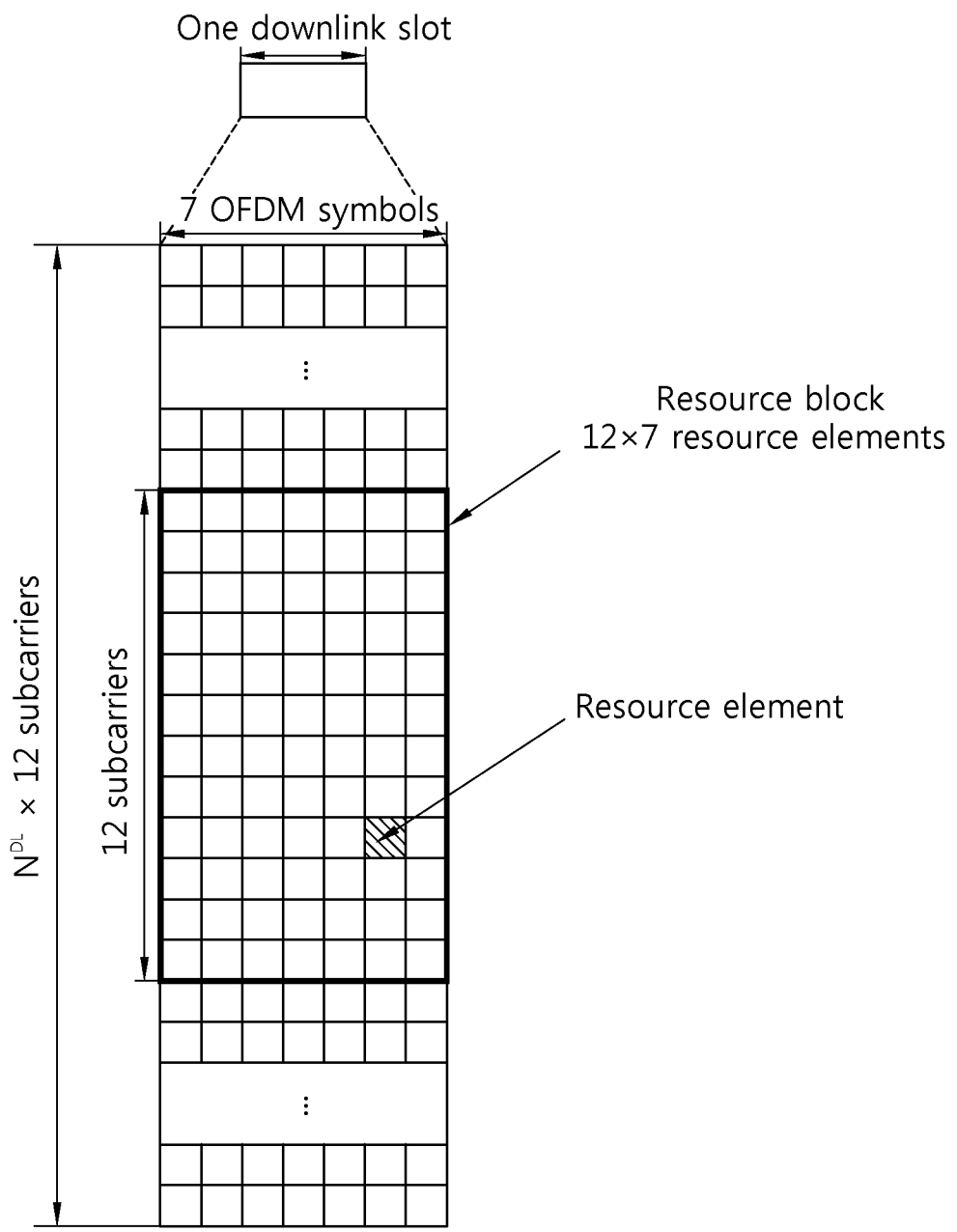
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12 - 1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
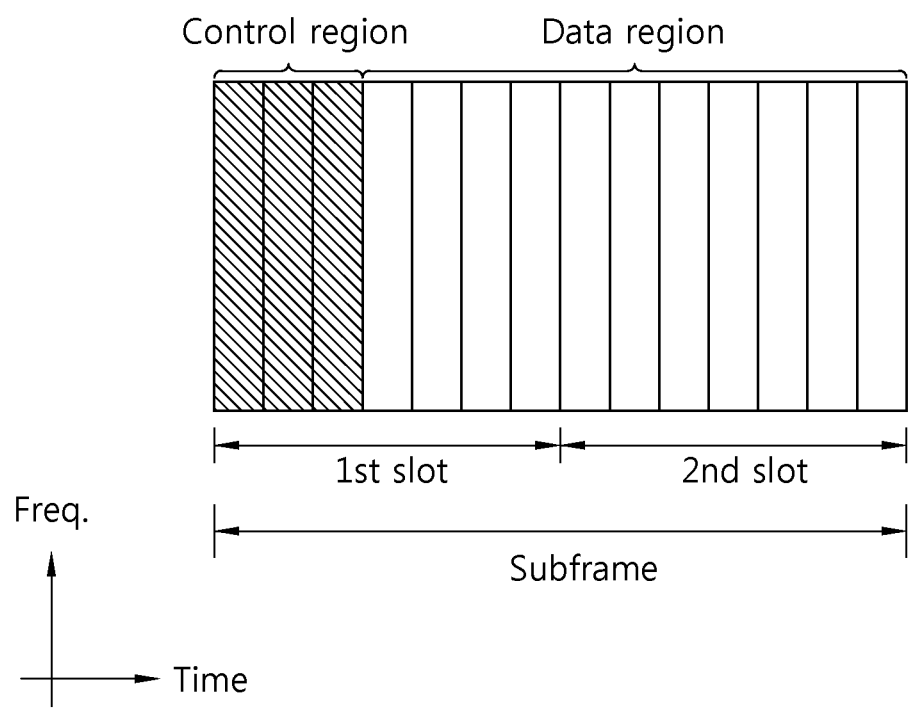
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (4 according to circumstances) OFDM symbols of a first slot within a subframe, but the number of OFDM symbols included in the control region can be varied. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Figure 5:
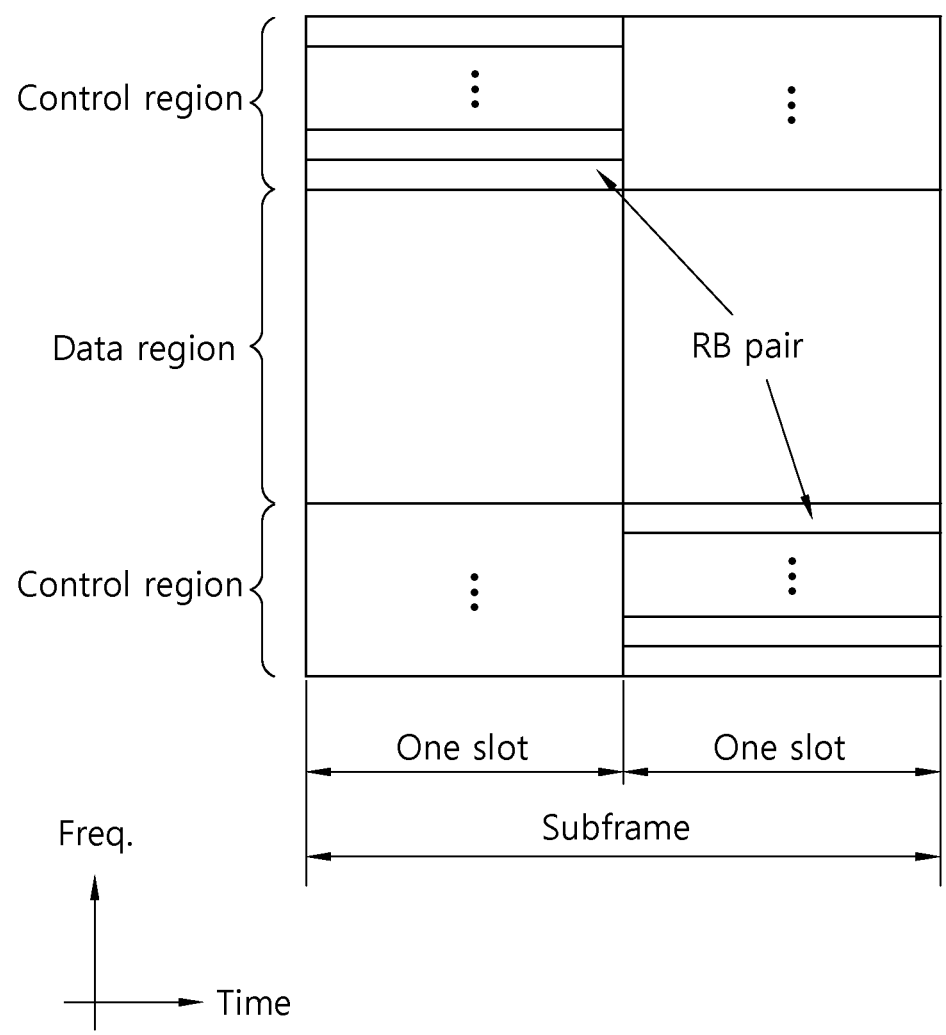
FIG. 5 shows the structure of an UL subframe.

FIG. 5 shows the structure of an UL subframe.

Referring to FIG. 5, the UL subframe can be divided into a control region to which a physical uplink control channel (PUCCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n)=e^{jb(n)\pi/4} \qquad \text{[Equation 1]}$$

Here, u is a root index, n is an element index wherein $0 \leq n \leq N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc. Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence $r(n)$ as in Equation 2.

$$r(n, I_{cs}) = r(n) \cdot \exp\left(\frac{j2\pi I_{cs} n}{N}\right), \qquad \text{[Equation 2]}$$
$$0 \leq I_{cs} \leq N - 1$$

Here, $I_{cs}$ is a CS index indicative of a CS amount ($0 \leq I_{cs} \leq N-1$).

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 6:
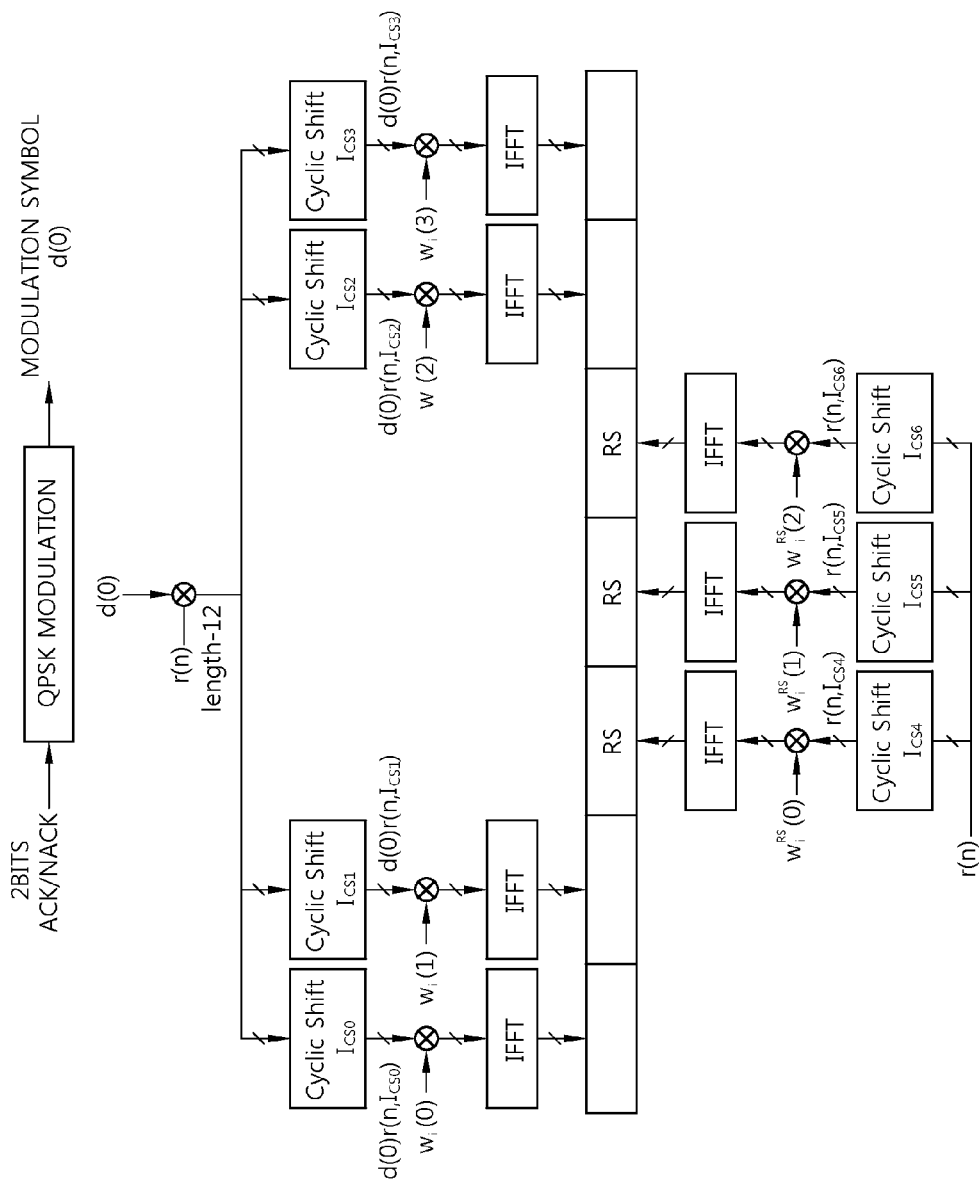
FIG. 6 shows the channel structure of a PUCCH format 1b in a normal CP.

FIG. 6 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1 b, a modulation symbol d(0) is generated by performing Quadrature Phase Shift Keying (QPSK) modulation on an encoded 2-bit ACK/NACK signal.

A CS index $I_{cs}$ can vary depending on a slot number '$n_s$' within a radio frame and/or a symbol index 'l' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence $r(n,I_{cs})$. Assuming that a 1-dimensional spread sequence corresponding to an $(i+1)^{th}$ OFDM symbol is m(i) in a slot, {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)} can be obtained.

In order to increase a UE capacity, the 1-dimensional spread sequence can be spread using an orthogonal sequence. The following sequence is used as an orthogonal sequence $w_i(k)$ (i is a sequence index, $0 \leq k \leq K-1$) wherein a spreading factor K=4.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, 0≤k≤K−1) wherein a spreading factor K=3.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences {s(0), s(1), s(2), s(3)} can be expressed as follows.

$$\{s(0),s(1),s(2),s(3)\}=\{w_i(0)m(0),w_i(1)m(1),w_i(2)m(2), w_i(3)m(3)\}$$

The 2-dimensional spread sequences {s(0), s(1), s(2), s(3)} are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences r(n,$I_{cs4}$), r(n,$I_{cs5}$), r(n,$I_{cs6}$) can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH}=n_{CCE}+{}^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 7:
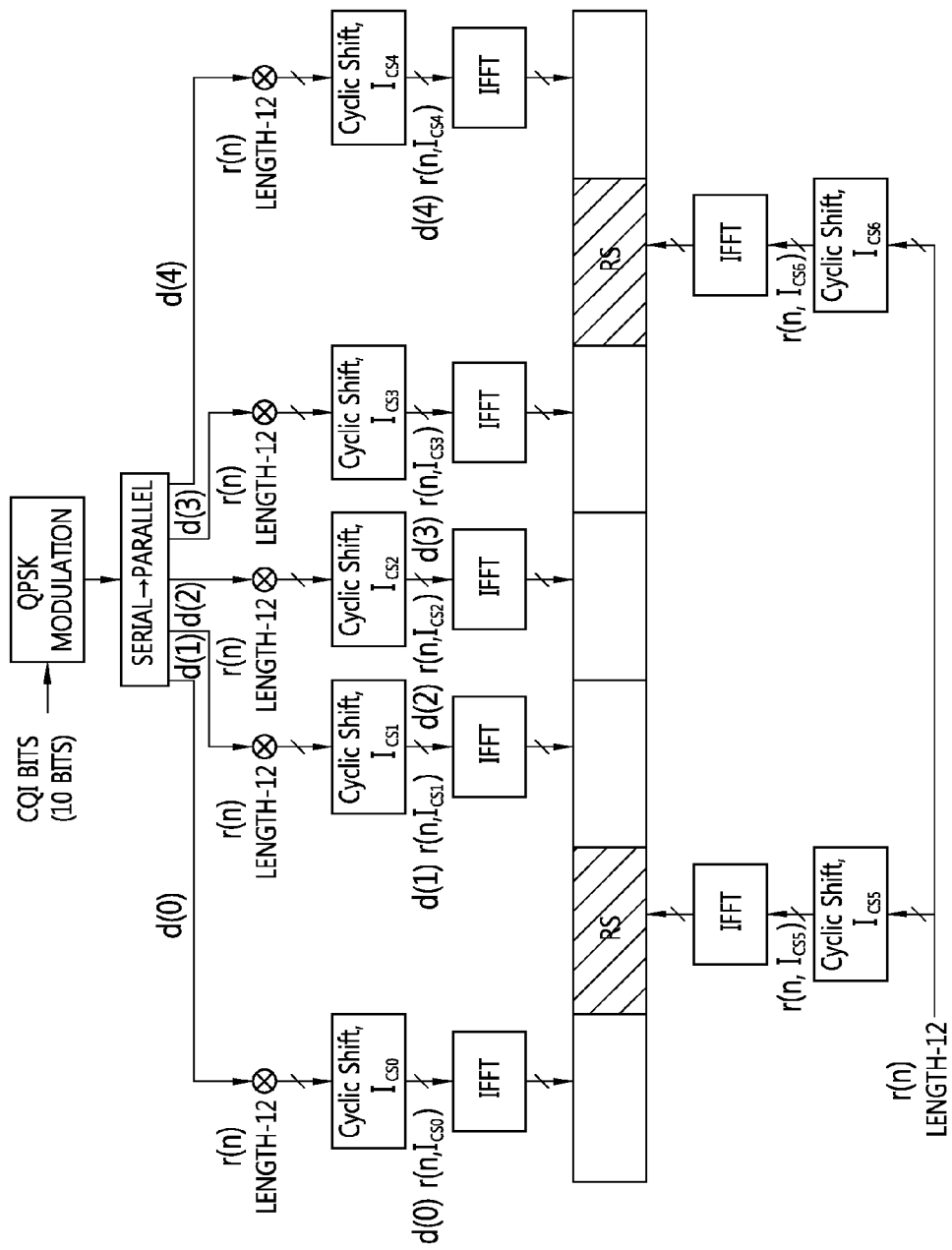
FIG. 7 shows the channel structure of PUCCH formats 2/2a/2b in a normal CP.

FIG. 7 shows the channel structure of the PUCCH formats 2/2a/2b in a normal CP.

Referring to FIG. 7, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a 1/2 code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 8:
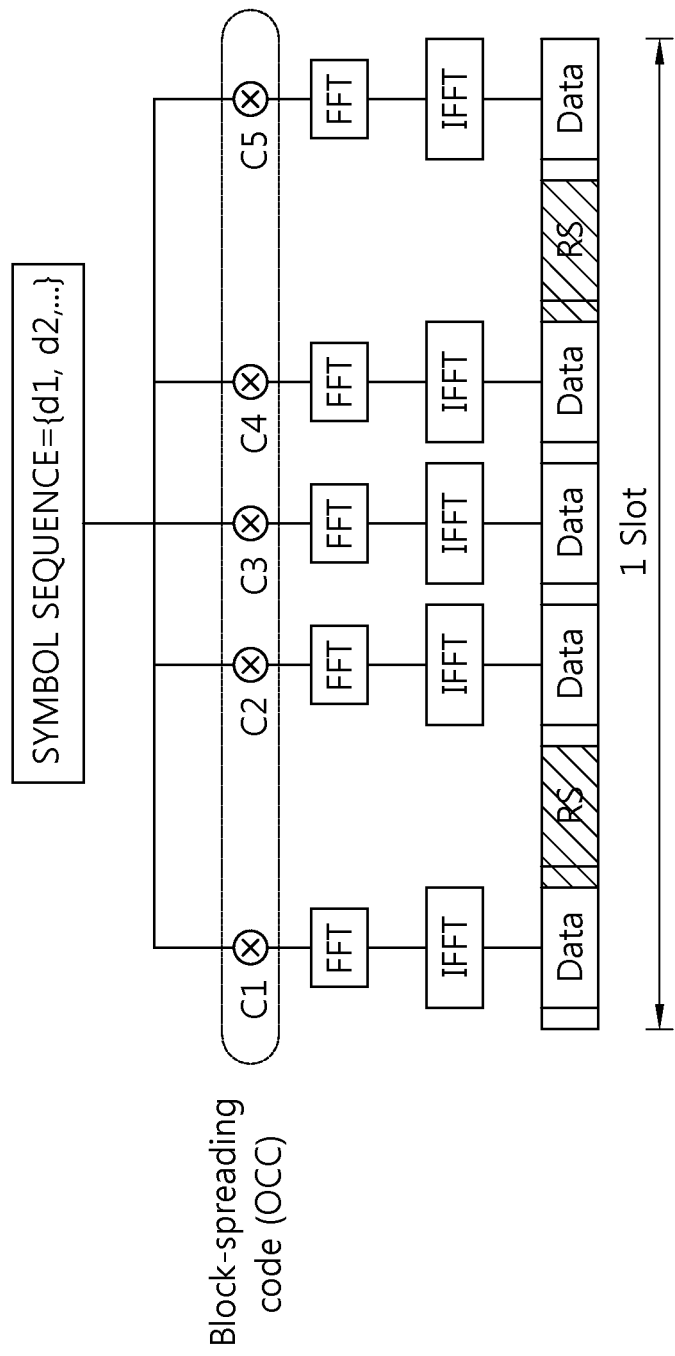
FIG. 8 illustrates an Enhanced (E)-PUCCH format based on block-spreading.

FIG. 8 illustrates an Enhanced (E)-PUCCH format based on block-spreading.

An E-PUCCH format is also called the PUCCH format 3.

Referring to FIG. 8, the E-PUCCH format is a PUCCH format that uses a block-spreading scheme. The block-spreading scheme means a method of multiplexing a modulation symbol sequence that has been modulated from multi-bit ACK/NACK using block-spreading code. An SC-FDMA scheme can be used in the block-spreading scheme. Here, the SC-FDMA scheme means a transmission method of performing IFFT after DFT spreading.

An E-PUCCH format is transmitted in such a manner that a symbol sequence (e.g., ACK/NACK symbol sequence) is spread in the time domain by way of block-spreading code. Orthogonal Cover Code (OCC) can be used as the block-spreading code. The control signals of several MSs can be multiplexed by the block-spreading code. In the PUCCH format 2, one symbol sequence is transmitted in the time domain, and UE multiplexing is performed using the cyclic shift of a Constant Amplitude Zero Auto-Correlation (CAZAC) sequence. In contrast, in the E-PUCCH format, a symbol sequence including one or more symbols is transmitted in the frequency domain of each data symbol, the symbol sequence is spread in the time domain by way of block-spreading code, and UE multiplexing is performed. An example in which 2 RS symbols are used in one slot has been illustrated in FIG. 8, but the present invention is not limited thereto. 3 RS symbols can be used, and OCC in which a spreading factor value is 4 may be used. An RS symbol can be generated from a CAZAC sequence having a specific CS and can be transmitted in such a manner that a plurality of RS symbols in the time domain has been multiplied by specific OCC.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n-k associated with an UL subframe n according to an UL-DL configuration in 3GPP LTE, wherein k∈K and M is the number of elements of a set K.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It is assumed that M DL subframes are associated with the UL subframe n and, for example, M=3. In this case, UE can obtain 3 PUCCH resources $n^{(1)}_{PUCCH,0}$, $n^{(1)}_{PUCCH,1}$ and $n^{(1)}_{PUCCH,2}$ because it can receive 3 PDCCHs from 3 DL subframes. In this case, an example of ACK/NACK channel selection is the same as the following table.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the above table, HARQ-ACK(i) indicates ACK/NACK for an $i^{th}$ DL subframe of M DL subframes. Discontinuous transmission (DTX) means that a DL transport block has not been received on a PDSCH in a corresponding DL subframe or that a corresponding PDCCH has not been detected. In accordance with Table 6, 3 PUCCH resources $n^{(1)}_{PUCCH,0}$, $n^{(1)}_{PUCCH,1}$, and $n^{(1)}_{PUCCH,2}$ are present, and b(0), b(1) are two bits transmitted using a selected PUCCH.

For example, when UE successfully receives all 3 DL transport blocks in 3 DL subframes, the UE performs QPSK modulation on bits (1,1) using $n^{(1)}_{PUCCH,2}$ and sends them on a PUCCH. If UE fails in decoding a DL transport block in a first (i=0) DL subframe, but succeeds in decoding the remaining transport blocks, the UE sends bits (1,0) on a PUCCH using $n^{(1)}_{PUCCH,2}$. That is, in the existing PUCCH format 1b, only ACK/NACK of 2 bits can be transmitted. In channel selection, however, allocated PUCCH resources are linked to an actual ACK/NACK signal in order to indicate more ACK/NACK states.

In ACK/NACK channel selection, if at least one ACK is present, NACK and DTX are coupled. This is because all ACK/NACK states cannot be represented by a combination of reserved PUCCH resources and a QPSK symbol. If ACK is not present, however, DTX is decoupled from NACK.

The above-described ACK/NACK bundling and ACK/NACK multiplexing can be applied in the case where one serving cell has been configured in UE in TDD.

For example, it is assumed that one serving cell has been configured (i.e., only a primary cell is configured) in UE in TDD, ACK/NACK bundling or ACK/NACK multiplexing is used, and M=1. That is, it is assumed that one DL subframe is associated with one UL subframe.

1) UE sends ACK/NACK in a subframe n if the UE detects a PDSCH indicated by a corresponding PDCCH in a subframe n-k of a primary cell or detects a Semi-Persistent Scheduling (SPS) release PDCCH. In LTE, a BS can inform UE that semi-persistent transmission and reception are performed in what subframes through a higher layer signal, such as Radio Resource Control (RRC). Parameters given by the higher layer signal can be, for example, the periodicity of a subframe and an offset value. When the UE receives the activation or release signal of SPS transmission through a PDCCH after recognizing semi-persistent transmission through the RRC signaling, the UE performs or releases SPS PDSCH reception or SPS PUSCH transmission. That is, the UE does not immediately perform SPS transmission/reception although SPS scheduling is allocated thereto through the RRC signaling, but when an activation or release signal is received through a PDCCH, performs SPS transmission/reception in a subframe that corresponds to frequency resources (resource block) according to the allocation of the resource block designated by the PDCCH, modulation according to MCS information, subframe periodicity allocated through the RRC signaling according to a code rate, and an offset value. Here, a PDCCH that releases SPS is called an SPS release PDCCH, and a DL SPS release PDCCH that releases DL SPS transmission requires the transmission of an ACK/NACK signal.

Here, in the subframe n, UE sends ACK/NACK using the PUCCH formats 1a/1b according to a PUCCH resource $n^{(1,p)}_{PUCCH}$. In $n^{(1,p)}_{PUCCH}$, p indicates an antenna port p. The k is determined by Table 5.

The PUCCH resource $n^{(1,p)}_{PUCCH}$ can be allocated as in the following equation. P can be p0 or p1.

$$n^{(1,p=p0)}_{PUCCH} = (M-m-1) \cdot N_c + m \cdot N_{c+1} + n_{CCE} + N^{(1)}_{PUCCH} \text{ for antenna port } p=p0,$$

$$n^{(1,p=p1)}_{PUCCH} = (M-m-1) \cdot N_c + m \cdot N_{c+1} + (n_{CCE}+1) + N^{(1)}_{PUCCH} \text{ for antenna port } p=p1, \quad \text{[Equation 3]}$$

In Equation 3, c is selected in such a way as to satisfy $N_c \leq n_{CCE} < N_{c+1}$ (antenna port p0), $N_c \leq (n_{CCE}+1) < N_{c+1}$ (antenna port p1) from among {0,1,2,3}. $N^{(1)}_{PUCCH}$ is a value set by a higher layer signal. $N_c = \max\{0, \text{floor } [N^{DL}_{RB} \cdot (N^{RB}_{sc} \cdot c - 4)/36]\}$. The $N^{DL}_{RB}$ is a DL bandwidth, and $N^{RB}_{sc}$ is the size of an RB indicated by the number of subcarriers in the frequency domain. $n_{CCE}$ is a first CCE number used to send a corresponding PDCCH in a subframe n−$k_m$. m is a value that makes $k_m$ the smallest value in the set K of Table 5.

2) If UE detects an SPS PDSCH, that is, a PDSCH not including a corresponding PDCCH, in the DL subframe n-k of a primary cell, the UE can send ACK/NACK in the subframe n using the PUCCH resource $n^{(1,p)}_{PUCCH}$ as follows.

Since an SPS PDSCH does not include a scheduling PDCCH, UE sends ACK/NACK through the PUCCH formats 1a/1b according to $n^{(1,p)}_{PUCCH}$ that is configured by a higher layer signal. For example, 4 resources (a first PUCCH resource, a second PUCCH resource, a third PUCCH resource, and a fourth PUCCH resource) can be reserved through an RRC signal, and one resource can be indicated through the Transmission Power Control (TPC) field of a PDCCH that activates SPS scheduling.

The following table is an example in which resources for channel selection are indicated by a TPC field value.

TABLE 7

| TPC field value | Resources for channel selection |
| --- | --- |
| '00' | First PUCCH resource |
| '01' | Second PUCCH resource |
| '10' | Third PUCCH resource |
| '11' | Fourth PUCCH resource |

For another example, it is assumed that in TDD, one serving cell is configured (i.e., only a primary cell is configured) in UE, ACK/NACK multiplexing is used, and M>1. That is, it is assumed that a plurality of DL subframes is associated with one UL subframe.

1) A PUCCH resource $n^{(1)}_{PUCCH,i}$ for sending ACK/NACK when UE receives a PDSCH in a subframe n−$k_i$ (0≤i≤M−1) or detects a DL SPS release PDCCH can be allocated as in the following equation. Here, $k_i \in K$, and the set K has been described with reference to Table 5.

$$n^{(1)}_{PUCCH,i}=(M-i-1) \cdot N_c+i \cdot N_{c+1}+n_{CCE,i}+N^{(1)}_{PUCCH} \quad \text{[Equation 4]}$$

Here, c is selected from {0,1,2,3} so that $N_c \le n_{CCE,i} < N_{c+1}$ is satisfied. $N^{(1)}_{PUCCH}$ is a value set by a higher layer signal. $N_c=\max\{0, \text{floor } [N^{DL}_{RB} \cdot (N^{RB}_{sc} \cdot c-4)/36]\}$. The $N^{DL}_{RB}$ is a DL bandwidth, and $N^{RB}_{sc}$ is the size of an RB indicated by the number of subcarriers in the frequency domain. $n_{CCE,i}$ is a first CCE number used to send a corresponding PDCCH in the subframe n−$k_i$.

2) If UE receives a PDSCH (i.e., SPS PDSCH) not having a corresponding PDCCH in the subframe, $n^{(1)}_{PUCCH,i}$ is determined by a configuration given by a higher layer signal and Table 7.

If two or more serving cells have been configured in UE in TDD, the UE sends ACK/NACK using channel selection that uses the PUCCH format 1b or the PUCCH format 3.

For example, if a plurality of serving cells using channel selection that uses the PUCCH format 1b has been configured, when ACK/NACK bits are greater than 4 bits, UE performs spatial ACK/NACK bundling on a plurality of codewords within one DL subframe and sends spatially bundled ACK/NACK bits for each serving cell through channel selection that uses the PUCCH format 1b. Spatial ACK/NACK bundling means the compression of ACK/NACK for each codeword through logical AND operations within the same DL subframe.

If ACK/NACK bits are 4 bits or lower, spatial ACK/NACK bundling is not used and the ACK/NACK bits are transmitted through channel selection that uses the PUCCH format 1b.

For another example, if 2 or more serving cells using the PUCCH format 3 have been configured in UE, when ACK/NACK bits are greater than 20 bits, spatial ACK/NACK bundling can be performed in each serving cell and ACK/NACK bits subjected to spatial ACK/NACK bundling can be transmitted through the PUCCH format 3.

In the prior art, a precondition was that a plurality of serving cells configured in UE has the same UL-DL configuration. In the next-generation wireless communication system, however, each serving cell may have a different UL-DL configuration. In this case, some of the same subframes for a plurality of serving cells may be configured to be DL subframes, and the remaining subframes may be configured to be UL subframes.

Table 8 below shows that ACK/NACK is transmitted in what a subframe according to an UL-DL configuration when one serving cell operates in TDD.

TABLE 8

| UL-DL Configuration | Subframe n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | 4 | 6 | — | | | 4 | 6 | — | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

When UE receives a PDSCH or a PDCCH (e.g., DL SPS release PDCCH) necessary for an ACK/NACK response in a subframe n, the UE sends ACK/NACK in a subframe 'n+k(n)'. Each of the values of Table 8 indicates the k(n) value. For example, Table 8 indicates that if an UL-DL configuration is 0 and a PDSCH is received in a subframe 0, ACK/NACK is transmitted in a subframe 4 after four subframes. A specific time is necessary in order for UE to send ACK/NACK after receiving a PDSCH or a DL SPS release PDCCH. A minimum value of this specific time is hereinafter indicated as and a value of $k_{min}$ can be four subframes. In Table 8, a point of time at which ACK/NACK is transmitted is described below. It can be seen that ACK/NACK is chiefly transmitted in the first UL subframe after '$k_{min}$' elapses. However, an underline number in Table 8 does not indicates the first UL subframe after '$k_{min}$' elapses, but indicates an UL subframe placed next. This is for preventing ACK/NACK for too many DL subframes from being transmitted in one UL subframe.

[HARQ]

In UL, a BS schedules one or more resource blocks for selected UE in accordance with a predetermined scheduling rule, and the UE sends data using the allocated resources. An error control method when a frame is lost or damaged after scheduling is performed and data is transmitted includes an automatic repeat request (ARQ) method and a Hybrid ARQ (HARQ) method that is a more advanced form. Basically, in the ARQ method, the transmission side waits for the coming of an acknowledgement message (ACK) after sending one frame. The reception side sends the acknowledgement message (ACK) only when the frame is normally received. If an error occurs in the frame, the reception side sends a negative-ACK or not-acknowledgement (NACK) message.

Information about the erroneous frame is deleted from the buffer of the reception side. The transmission side sends a subsequent frame when an ACK signal is received from the reception side, but retransmits the frame when a NACK message is received from the reception side.

Unlike in the ARQ method, in the HARQ method, if a received frame cannot be demodulated, the reception side sends a NACK message to the transmission side, but stores an already received frame in its buffer for a specific time so that the already received frame is associated with a previously received frame when the already received frame is retransmitted in order to increase a reception success ratio. An HARQ method more efficient than the basic ARQ method is recently used more widely. The HARQ method includes various types. The HARQ method can be basically divided into a synchronous HARQ and an asynchronous HARQ depending on retransmission timing and can be divided into a channel-adaptive method and a channel-non-adaptive method depending on whether or not a channel state is incorporated into the amount of resources that are used upon retransmission.

The synchronous HARQ method is a method of performing subsequent data retransmission at timing determined by a system when the initial transmission of data fails. For example, assuming that timing at which data retransmission is performed is performed every fourth timing (subframe) after an initial transmission fail signal is received, it is not necessary to inform retransmission timing additionally because the timing has already been agreed between a BS and UE. If the data transmission side has received a NACK message, the data transmission side retransmits data in a subframe at the next agreed timing. This process is repeated until an ACK message instead of a NACK message is received. For example, it has been agreed that data will be retransmitted in a fourth subframe after every NACK is received. Even in the synchronous HARQ method, in order to control frequency resource allocation for retransmission, a modulation scheme, etc., a control channel including scheduling information for the frequency resource allocation, the modulation scheme, etc., can be transmitted.

In contrast, in the asynchronous HARQ method, even if there is an ACK/NACK response, retransmission is not immediately performed in response to the ACK/NACK response, but retransmission timing is newly scheduled or additional signaling can be performed. Timing at which retransmission for previously failed data transmission is performed may vary depending on various factors, such as a channel state.

The channel-non-adaptive HARQ method is a method in which a modulation scheme for data upon retransmission, the number of resource blocks used, and the like are performed as scheduled upon initial transmission. In contrast, the channel-adaptive HARQ method is a method in which a modulation scheme for data, the number of resource blocks, and the like are varied depending on the state of a channel. For example, in the channel-non-adaptive HARQ method, the transmission side sends data using 6 resource blocks upon initial transmission and likewise retransmits data using the 6 resource blocks upon retransmission. In contrast, in the channel-adaptive HARQ method, although transmission was initially performed using 6 resource blocks, retransmission is performed using resource blocks larger than or smaller than the 6 resource blocks depending on a channel state.

Four combinations of HARQ can be performed according to the classification. HARQ methods that are chiefly used include an asynchronous and channel-adaptive HARQ method and a synchronous and channel-non-adaptive HARQ method. The asynchronous and channel-adaptive HARQ method can maximize retransmission efficiency by adaptively varying retransmission timing and the amount of resources used depending on the state of a channel, but this method is not commonly taken into consideration for UL because it has a disadvantage in that overhead is increased. Meanwhile, the synchronous and channel-non-adaptive HARQ method is advantageous in that there is almost no signaling overhead for timing for retransmission and resource allocation because the timing for retransmission and the resource allocation are agreed within a system, but is disadvantageous in that retransmission efficiency is low if this method is used in a channel state that varies severely.

In current 3GPP LTE, an asynchronous HARQ method is used in downlink, and a synchronous HARQ method is used in uplink.

Figure 9:
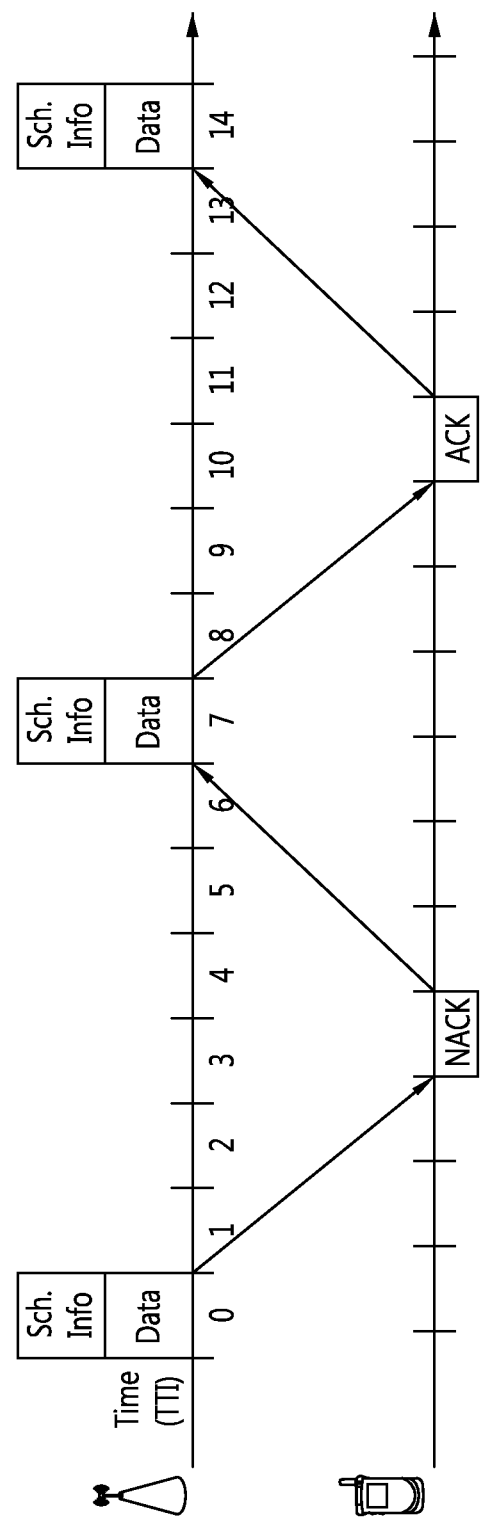
FIG. 9 shows an example of a DL HARQ.

FIG. 9 shows an example of a DL HARQ.

Referring to FIG. 9, after scheduling information and data are transmitted, information about ACK/NACK is received from UE and next data is transmitted. The next data can be new data or the retransmission data. As shown in FIG. 9, there is time delay until the next data is transmitted. Such time delay is caused by channel propagation delay and delay generated due to the time taken for data decoding and data encoding. A method of transmitting data using an independent HARQ process for data transmission not having a blank during such a delay interval is being used. For example, if the shortest period between data transmission and the next data transmission is 7 subframes, 7 independent HARQ processes can be placed so that data is transmitted without a blank. In LTE, if an operation is not performed according to MIMO, a maximum of 8 HARQ processes can be allocated.

An UL HARQ process includes a process of transmitting a scheduled PUSCH in response to an UL grant, receiving ACK/NACK for the PUSCH through a PHICH, and retransmitting the PUSCH if NACK is included in the PHICH.

Hereinafter, for convenience of description, a subframe interval until a PUSCH is transmitted after an UL grant is received is called k, and a subframe interval until a PHICH is received after the PUSCH is transmitted is called j. Furthermore, a subframe interval until the PUSCH is retransmitted after the PHICH is transmitted is called r, and a subframe interval until the PUSCH is retransmitted after an UL grant is received is called k'. k, j, r, and k' are called an HARQ timing relationship because timing at which an HARQ is performed can be aware based on k, j, r, and k'.

Figure 10:
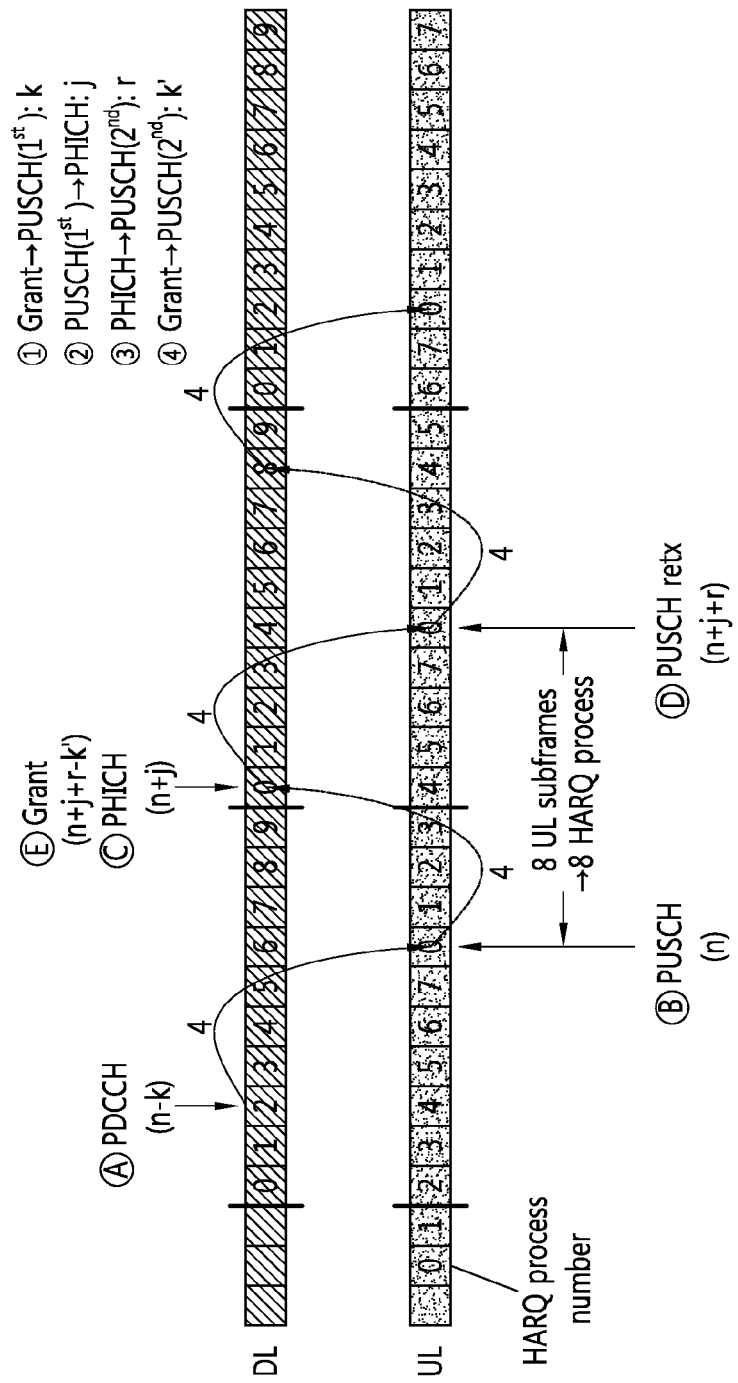
FIG. 10 shows a synchronization HARQ process in FDD.

FIG. 10 shows a synchronization HARQ process in FDD.

Referring to FIG. 10, assuming that a subframe that uses a PUSCH is a subframe n, a PDCCH is received in a subframe n-k. A PHICH is received in a subframe n+j, and a PUSCH is retransmitted in a subframe n+j+r. In this case, an UL grant for the retransmitted PUSCH is received in a subframe n+j+r-k'. That is, j+r is an interval during which a PUSCH for the same HARQ process is retransmitted.

In FDD, each timing relationship in FIG. 10 remains constant because a ratio of an UL subframe and a DL subframe is 1:1 and the UL subframe and the DL subframe are contiguous. That is, k=j=r=k'$k_{min}$. $k_{min}$ can be 4 subframes. Accordingly, 8 UL subframes are present until UE retransmits a PUSCH after transmitting the PUSCH, and 8 different HARQ processes can be performed.

In contrast, in TDD, a ratio of an UL subframe and a DL subframe may not be 1:1. Assuming that $k_{min}$, =4, k, j, r, and k' values can vary. Furthermore, the values may not be constant. For example, the k, j, r, and k' values can be changed depending on an UL-DL configuration of a TDD frame and a subframe number.

FIGS. 11 to 17 show examples of k, j, r, and k' values according to the UL-DL configurations (refer to Table 1) of the TDD frame and subframe numbers. In FIGS. 11 to 17, numbers within subframes denote respective UL HARQ process numbers (hereinafter abbreviated as HARQ process numbers), and numbers drawn in arrows denote respective subframe intervals. Here, an arrow drawn over the TDD frame indicates 1) that a PUSCH scheduled in response to an UL grant is transmitted in an UL subframe after how many subframes from a DL subframe in which the UL grant is received (k), or indicates that 2) a PUSCH is transmitted in an UL subframe after how many subframes from a subframe in which a PHICH is received (r), indicate that 3) a PUSCH is scheduled in response to an UL grant and retransmitted in an UL subframe after how many subframe from a DL subframe in which the UL grant is received (k'). Furthermore, an arrow indicated under the TDD frame indicates that 4) a PHICH that carries ACK/NACK for a PUSCH in an UL subframe in which the PUSCH is transmitted is received in a DL subframe after how many subframe (j).

The subframes in which the HARQ process numbers are written are UL subframes. The remaining subframes are DL subframes.

Figure 11:
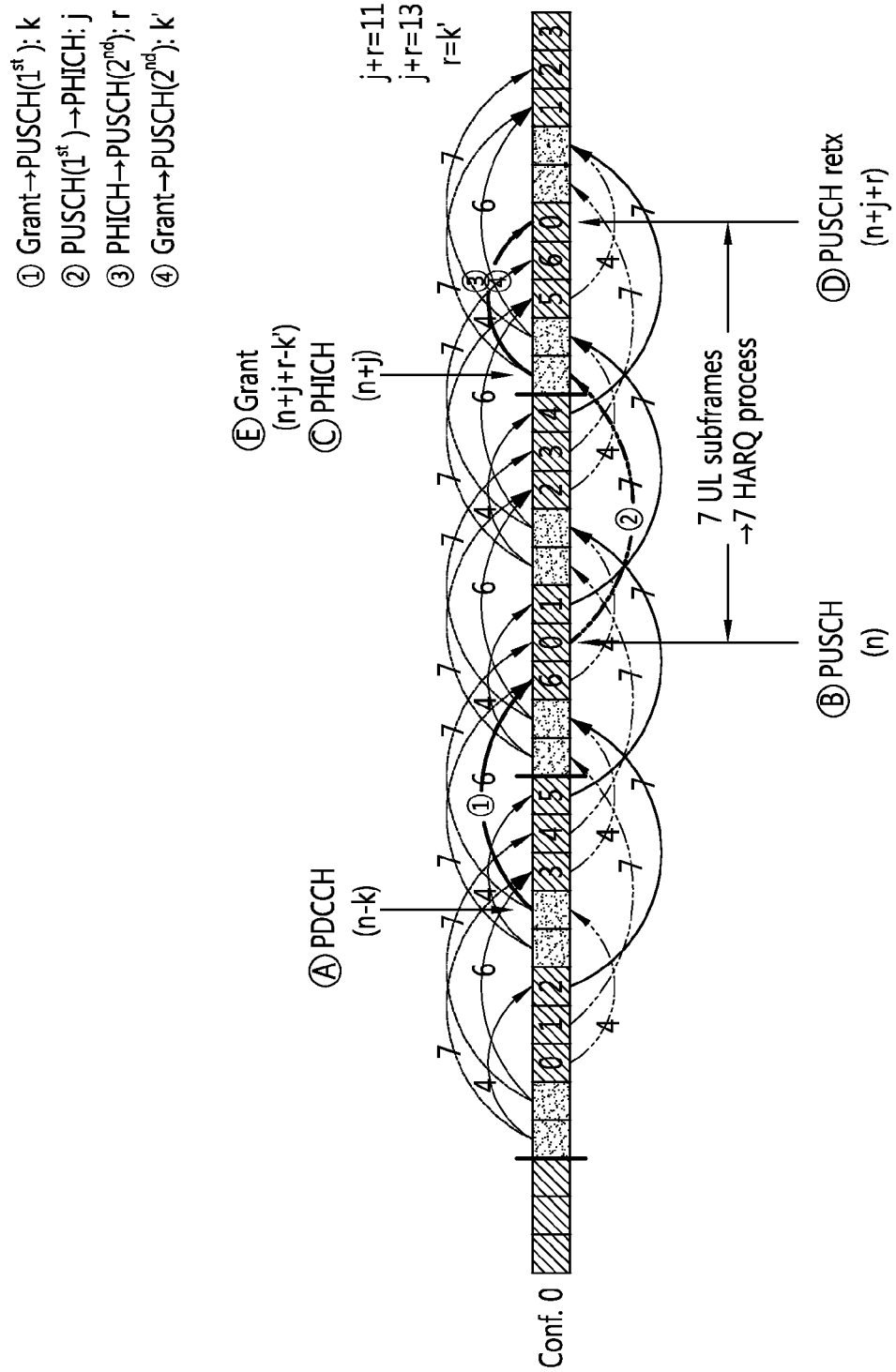
FIGS. 11 to 17 show examples of k, j, r, and k' values according to UL-DL configurations (refer to Table 1) of a TDD frame and subframe numbers.
Figure 12:
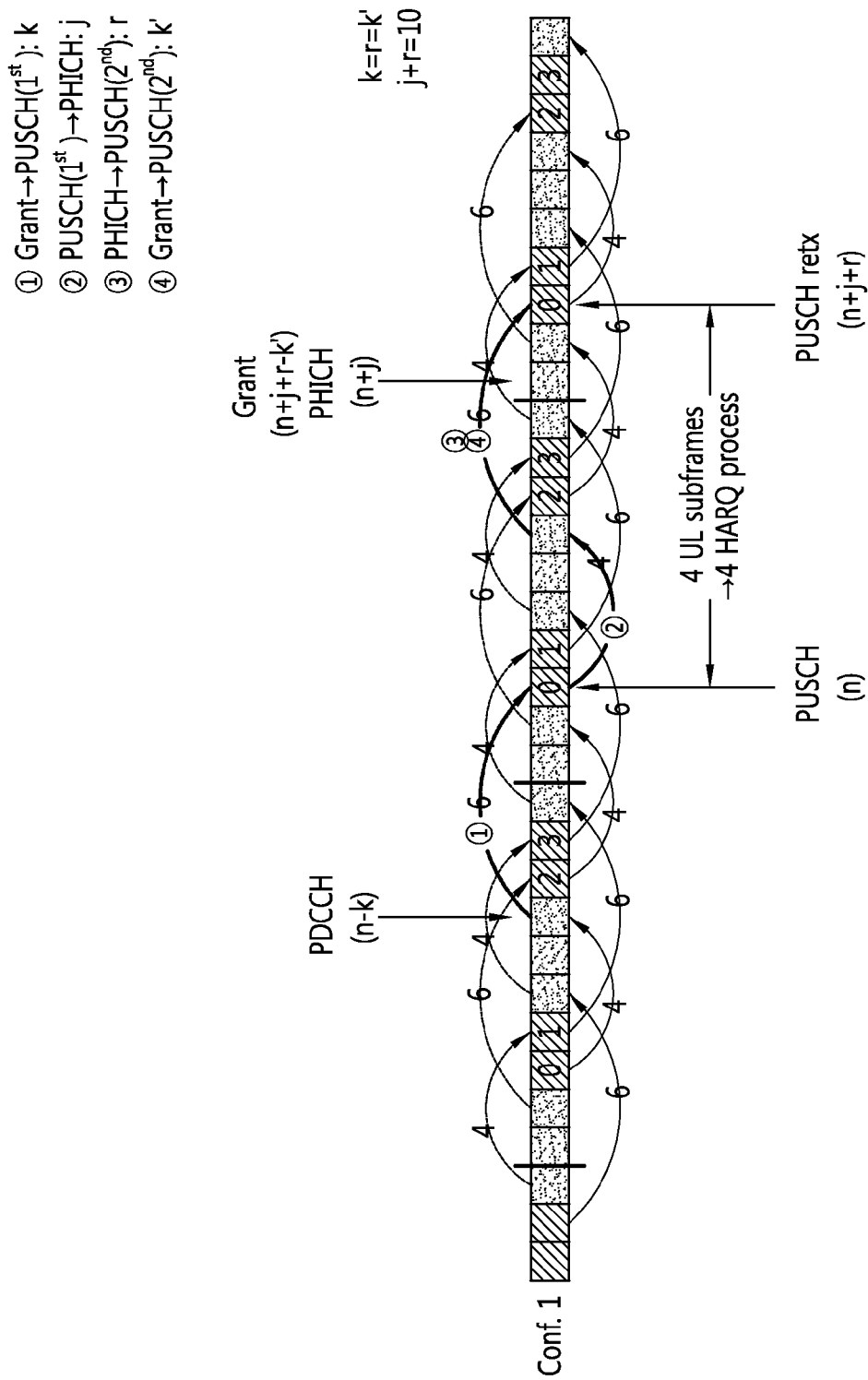
Figure 13:
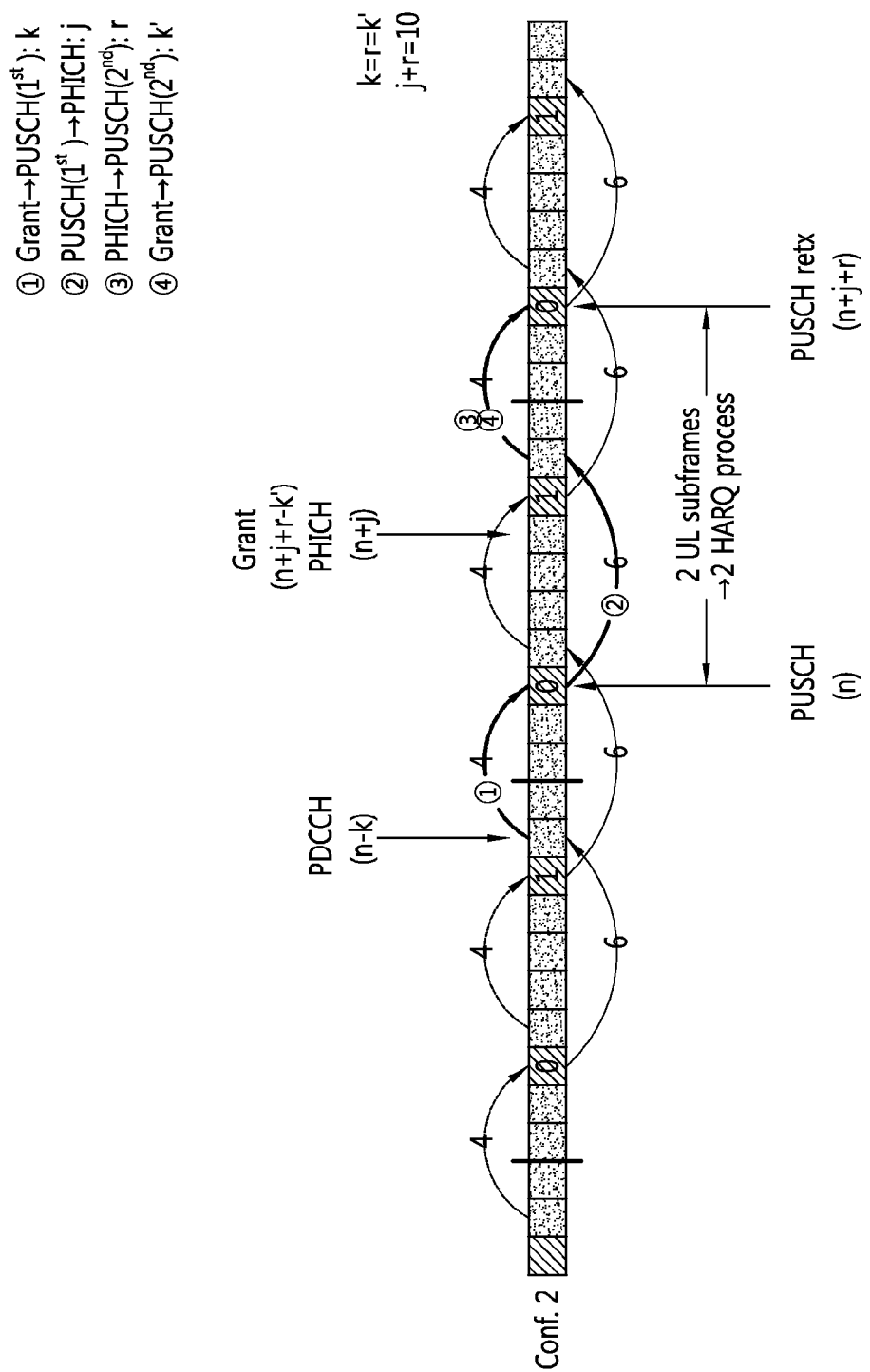
Figure 14:
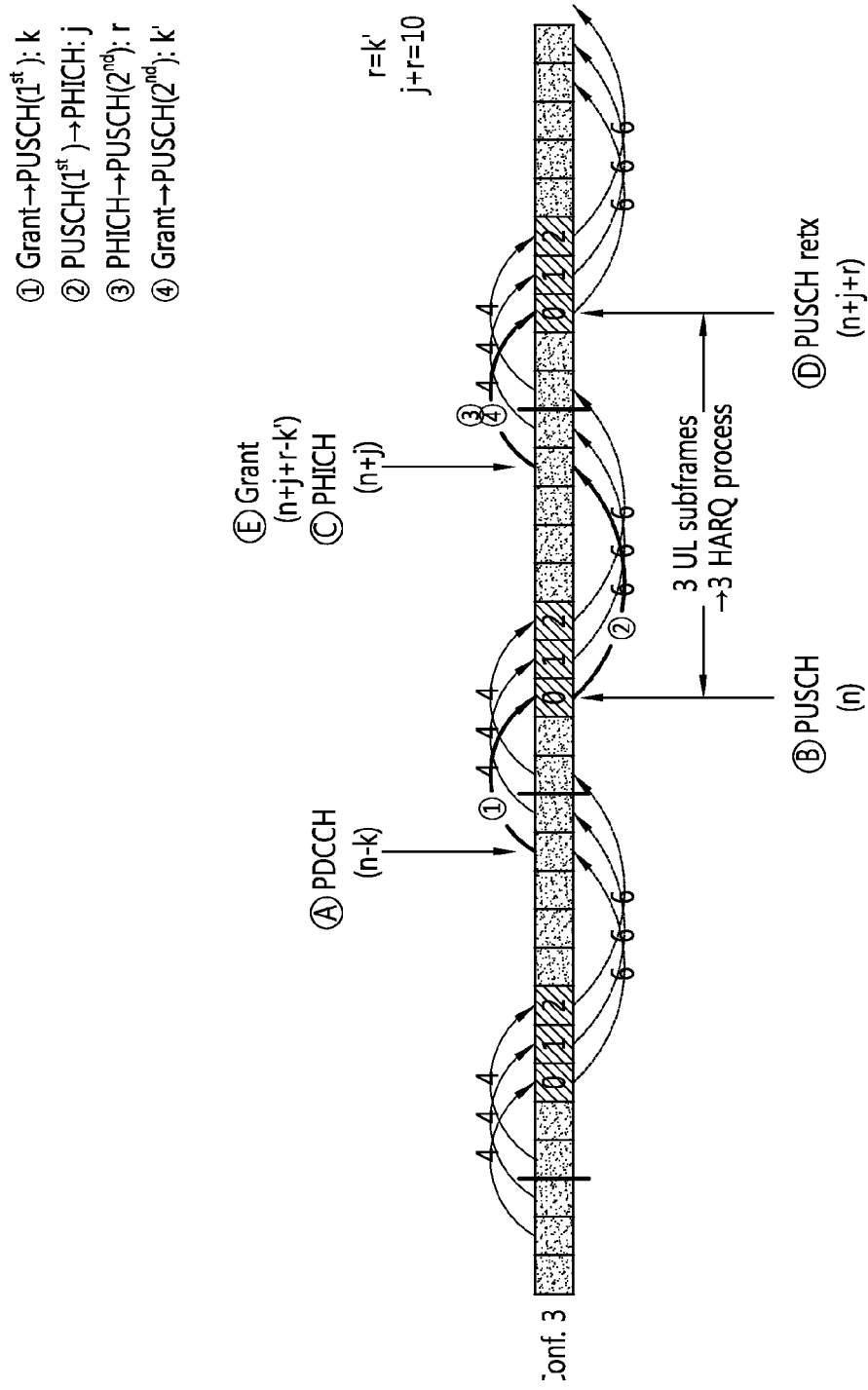
Figure 15:
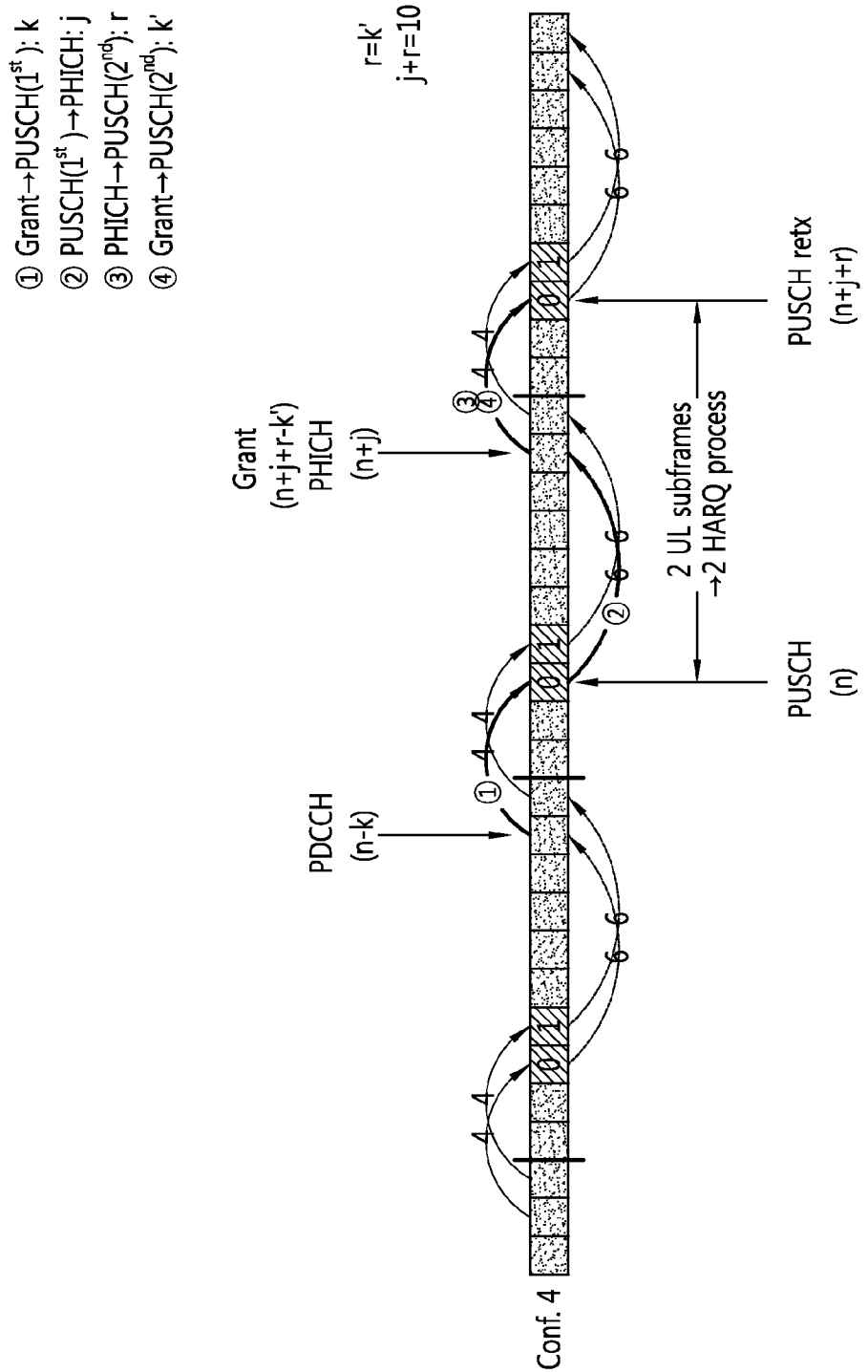
Figure 16:
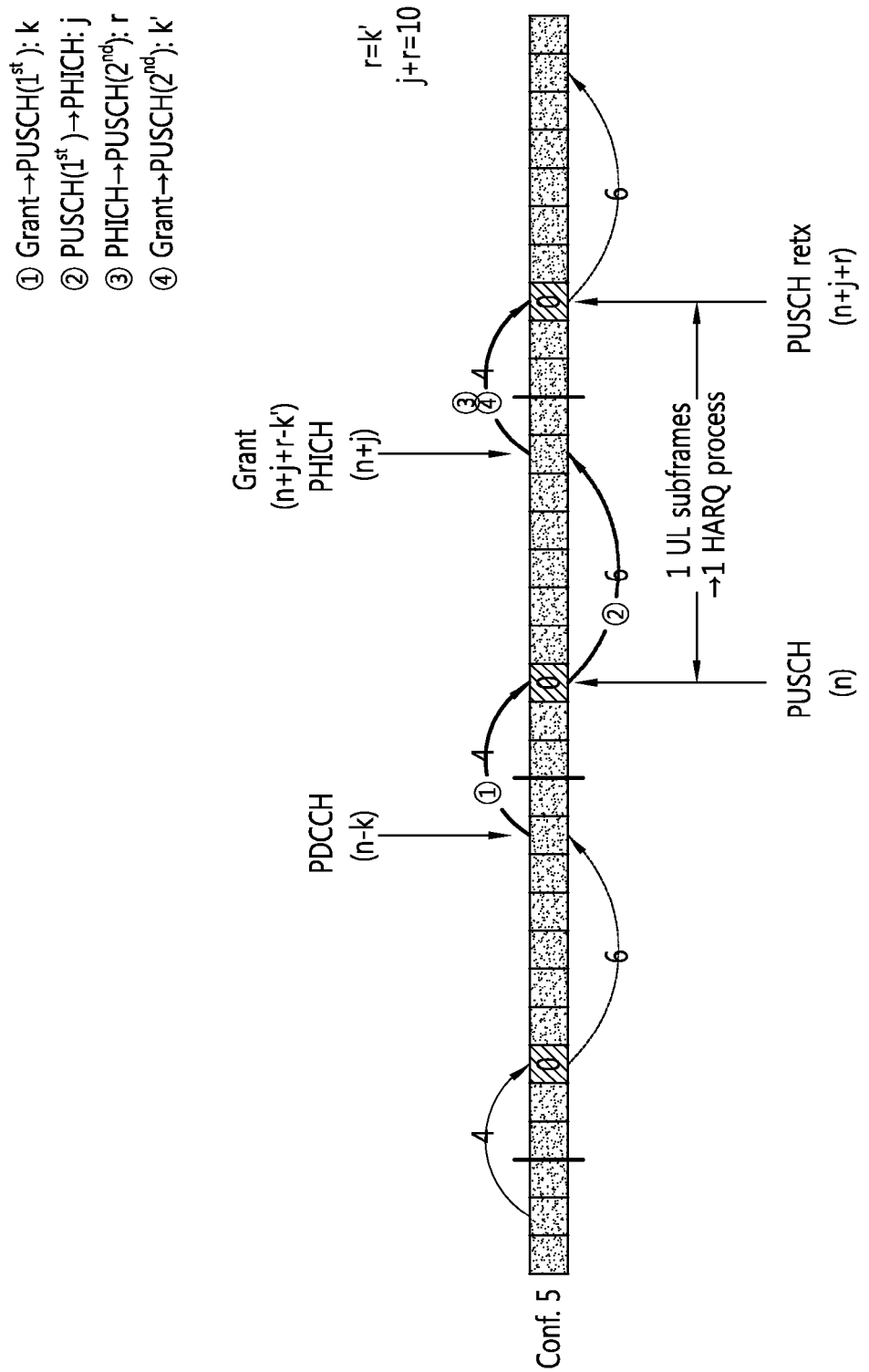
Figure 17:
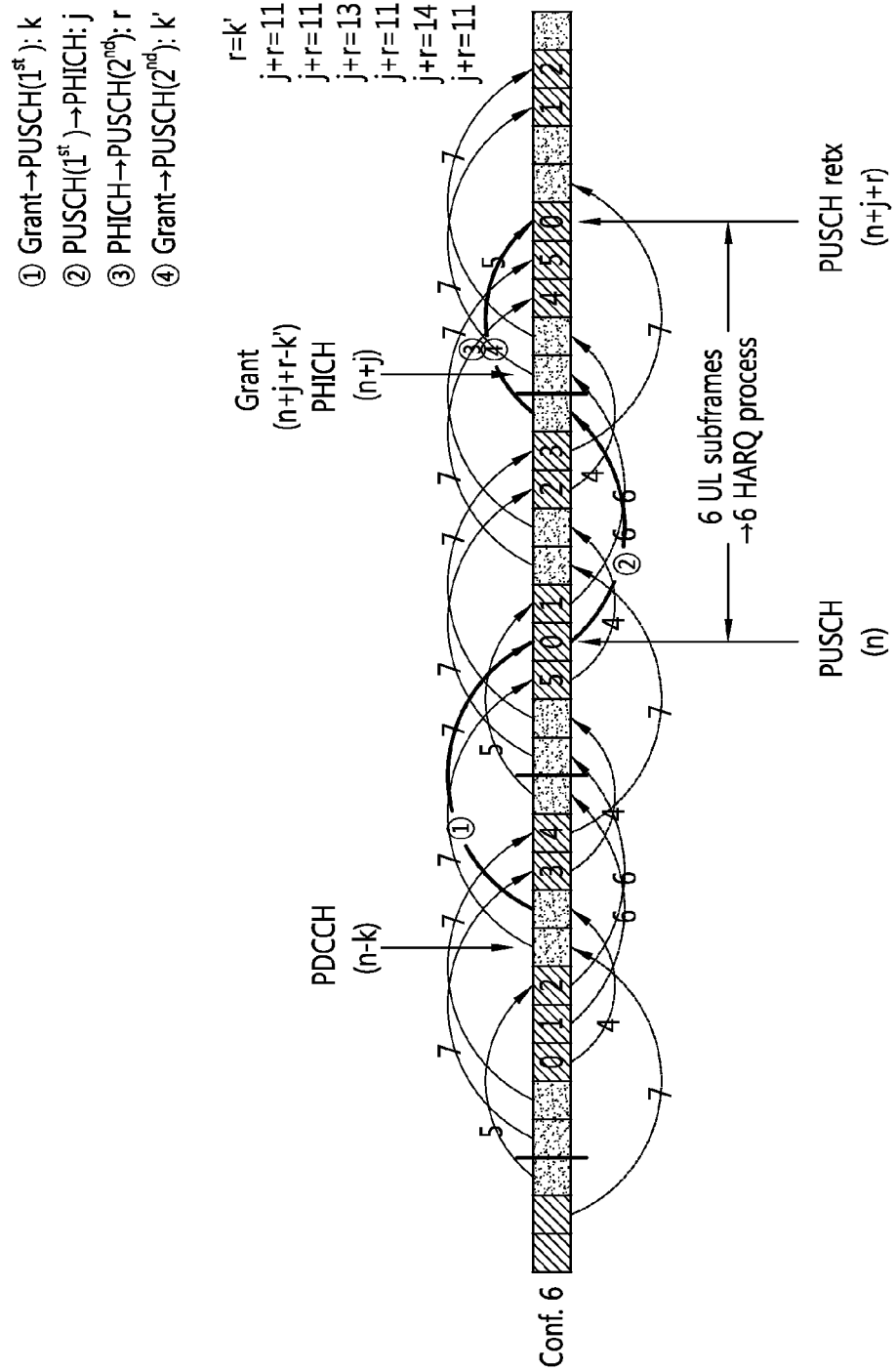

From FIG. 11, it can be seen that j+r=11 or j+r=13. From FIGS. 12 to 16, it can be seen that j+r=10, and from FIG. 17, it can be seen that a value of j+r is 11, 13, or 14.

The HARQ timing relationships shown in FIGS. 11 to 17 are HARQ timing relationships when UE accesses a single cell. In this case, a single cell complies with a cell-specific UL-DL configuration. The cell-specific UL-DL configuration can be broadcasted as the system information (e.g., SIB-1) of the corresponding cell. The cell-specific UL-DL configuration is used when UE accesses a cell through a single carrier or initially accesses a primary cell to be described later.

In drawings following FIGS. 11 to 17, an HARQ process number and a description generally given as an HARQ process number are for describing periodicity in which the same HARQ process is used and the number of HARQ processes, but there is no problem in that the present invention are applied to the HARQ process number and the description although an actually fixed HARQ process number is not present. Furthermore, illustrated HARQ timing is only an embodiment for a description.

A carrier aggregation system is described below. The carrier aggregation system is also called a multiple carrier system.

A 3GPP LTE system supports the case where a DL bandwidth and an UL bandwidth are differently configured, but one Component Carrier (CC) is a precondition in this case. The 3GPP LTE system supports a maximum of 20 MHz and supports only one CC in each of UL and DL although an UL bandwidth may be different from a DL bandwidth.

A carrier aggregation (or a bandwidth aggregation) (also called a spectrum aggregation) supports a plurality of CCs. For example, if 5 CCs are allocated as a granularity of each carrier having a 20 MHz bandwidth, a bandwidth having a maximum of 100 MHz can be supported.

One DL CC or a pair of an UL CC and a DL CC can correspond to one cell.

Accordingly, UE that communicates with a BS through a plurality of DL CCs can be said to be served from a plurality of serving cells.

Figure 18:
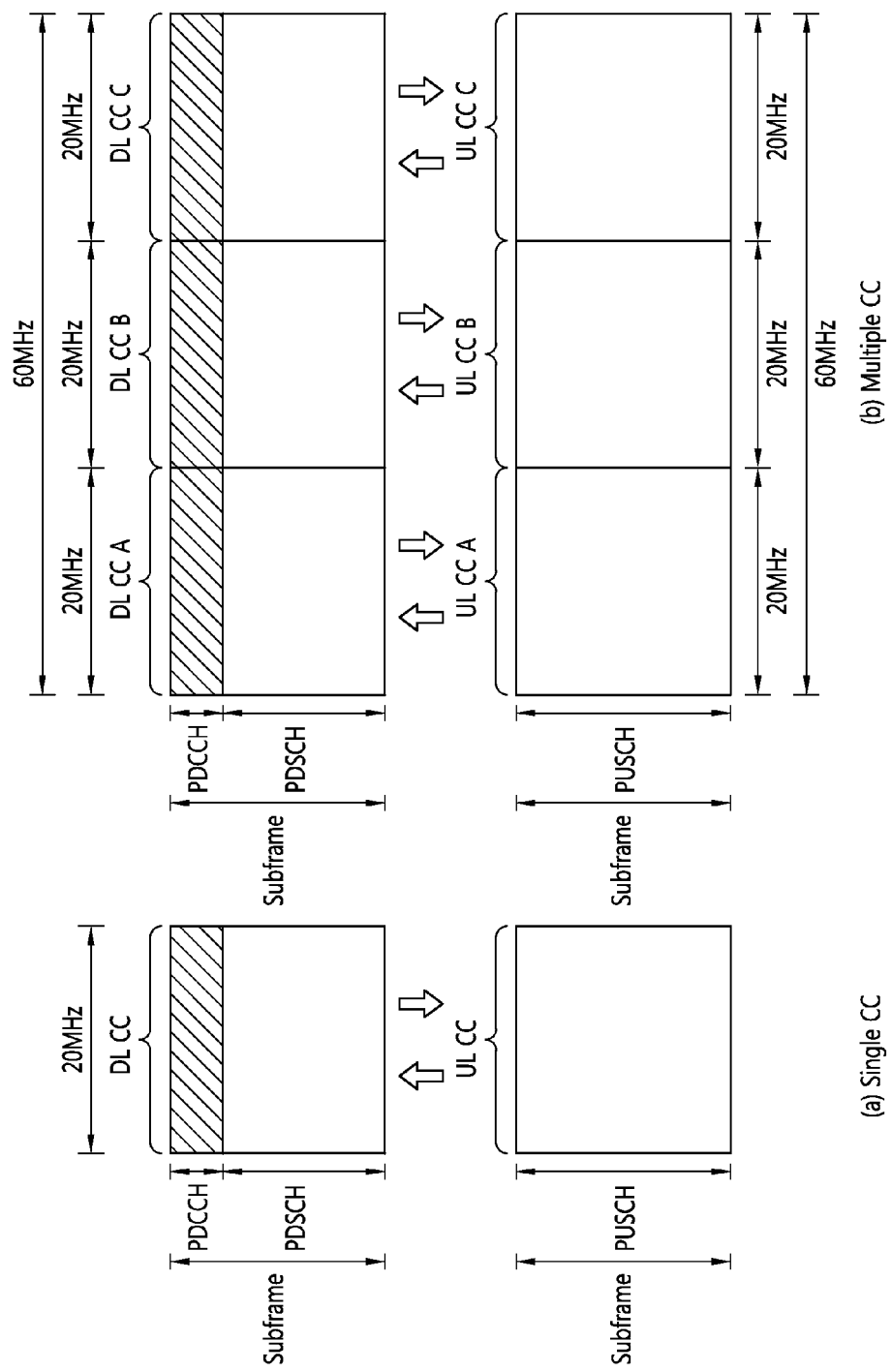
FIG. 18 is a comparison example of a single carrier system and a carrier aggregation system.

FIG. 18, including views (a) and (b), is a comparison example of a single carrier system as shown in FIG. 18(a) and a carrier aggregation system as shown in FIG. 18(b).

A carrier aggregation system of FIG. 18(b) includes three DL CCs and three UL CCs, but the number of each of DL CCs and UL CCs is not limited. A PDCCH and a PDSCH can be independently transmitted in respective DL CCs, and a PUCCH and a PUSCH can be independently transmitted in respective UL CCs. Alternatively, a PUCCH may be transmitted only through a specific UL CC.

Since three pairs of a DL CC and an UL CC are defined, UE can be said to be served from three serving cells.

The UE can monitor a PDCCH in a plurality of DL CCs and receive DL transport blocks through the plurality of DL CCs at the same time. The UE can send a plurality of UL transport blocks through a plurality of UL CCs at the same time.

A pair of a DL CC #A and an UL CC #A can become a first serving cell, a pair of a DL CC #B and an UL CC #B can become a second serving cell, and a pair of a DL CC #C and an UL CC#C can become a third serving cell. Each of the serving cells can be identified by a Cell index (CI). The CI can be unique within a cell or may be UE-specific.

A serving cell can be divided into a primary cell and a secondary cell. The primary cell is a cell on which UE performs an initial connection establishment procedure or initiates a connection re-establishment procedure or a cell designated as a primary cell in a handover process. The primary cell is also called a reference cell. The secondary cell can be configured after an RRC connection has been established and can be used to provide additional radio resources. At least one primary cell is always configured, and a secondary cell can be added/modified/released in response to higher layer signaling (e.g., an RRC message). The CI of a primary cell can be fixed. For example, the lowest CI can be designated as the CI of a primary cell.

Such a carrier aggregation system can support cross-carrier scheduling. Cross-carrier scheduling is a scheduling method capable of allocating PDSCH resources, transmitted through another CC, through a PDCCH transmitted through a specific CC and/or of allocating PUSCH resources transmitted through CCs other than a CC basically linked to the specific CC. That is, a PDCCH and a PDSCH can be transmitted different DL CCs, and a PUSCH can be transmitted through an UL CC different from an UL CC that is basically linked to a DL CC through which a PDCCH including an UL grant is transmitted. As described above, in a system that supports cross-carrier scheduling, there is a need for a carrier indicator that informs, through a PDCCH, that a PDSCH/PUSCH providing control information is transmitted through what DL CC/UL CC. A field including such a carrier indicator is called a Carrier Indication Field (CIF). Hereinafter, a scheduling carrier or a scheduling cell means a carrier or a serving cell through which an UL grant or a DL grant is transmitted, and a scheduled carrier or a scheduled cell means a carrier or a serving cell through which a data channel is received or transmitted in response to the UL grant or the DL grant.

Non-cross-carrier scheduling is a scheduling method extended from an existing scheduling method. That is, non-cross-carrier scheduling is a scheduling method of transmitting a PDSCH and a PDCCH for scheduling the PDSCH within the same DL CC. Furthermore, non-cross-carrier scheduling is a scheduling method of transmitting a PDCCH for scheduling a PUSCH in a DL CC and transmitting a PUSCH in an UL CC that is basically linked to the DL CC.

In an existing carrier aggregation system, it was a precondition that serving cells use only radio frames having the same type. Furthermore, it was a precondition that if each serving cell operates according to TDD, a TDD frame is used, but the serving cells have the same UL-DL configuration. In the next-generation carrier aggregation system, however, the case where each serving cell uses a different UL-DL configuration is also taken into consideration.

Figure 19:
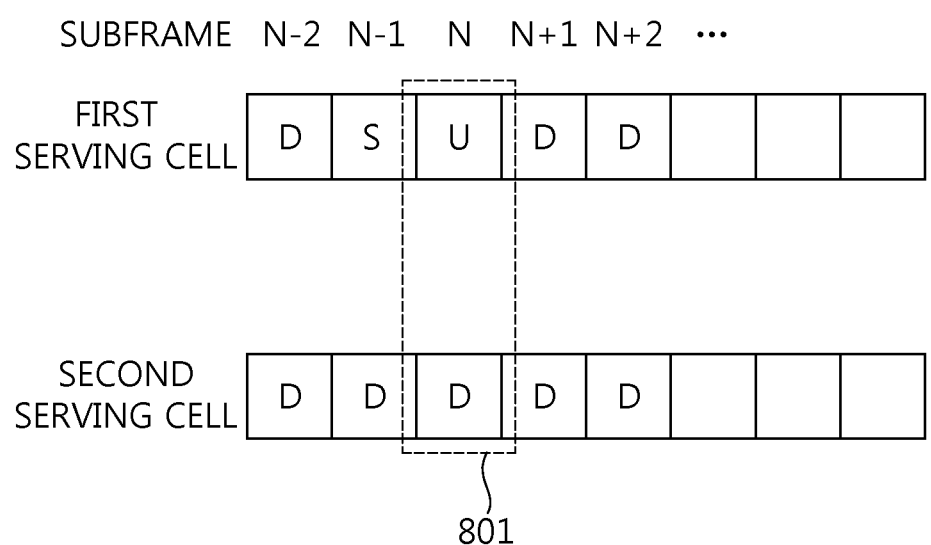
FIG. 19 shows an example in which each serving cell uses a different UL-DL configuration.

FIG. 19 shows an example in which each serving cell uses a different UL-DL configuration. If serving cells use different UL-DL configurations as described above, some subframes can become valid or invalid subframes. Here, the valid subframe means a DL or UL subframe in which data can be actually transmitted, and the invalid subframe means a DL or UL subframe in which data cannot be transmitted. In order for a subframe to become a valid subframe, a data channel itself needs to be transmitted in the corresponding subframe, and a control channel also needs to be transmitted in the corresponding subframe in a time interval (subframe) defined such that the control channel corresponding to the data channel (i.e., generating the transmission of the data channel) is transmitted. The following description is an example of a method of configuring valid and invalid subframes.

Referring to FIG. 19, a first serving cell and a second serving cell that are used in a TDD frame can be allocated. Here, the first serving cell and the second serving cell can use different UL-DL configurations. For example, a subframe #N of the first serving cell can be set as U, and a subframe #N of the second serving cell can be set as D. In this case, UE operating in half duplex can selectively use only one of UL and DL transmission directions in relation to the two serving cells, and the subframe #N having a transmission direction different from that selected in another serving cell can become an invalid subframe 801. For example, assuming that the transmission direction of the UE is set as an UL direction in the subframe #N and the subframe #N of the first serving cell is an UL subframe, the subframe #N of the first serving cell can be used as a valid subframe. In contrast, if the subframe #N of the second serving cell is a DL subframe, the subframe #N of the second serving cell becomes an invalid subframe. The UE operating in half duplex may not use an invalid subframe. The state of an invalid subframe that is not used as described above can be indicated by X in order to distinguish the invalid subframe from existing D, U, and S. All subframes set as D or U in the first serving cell and the second serving cell may be valid subframes. Furthermore, a special subframe S is a subframe that includes a gap (e.g., a Guard Period (GP)). The special subframe can become a DL valid subframe or a DL invalid subframe depending on configurations, such as a gap size.

The present invention can be applied to the case where cross-carrier scheduling is used in a carrier aggregation system in which a plurality of serving cells is aggregated. Here, it is a precondition that the serving cells can use different UL-DL configurations. One of the UL-DL configurations applied to the serving cells can be used as a reference UL-DL configuration. For example, an UL-DL configuration applied to a primary cell can be used as a reference UL-DL configuration.

Here, in the case of a subframe in which a transmission direction (UL or DL) according to a cell-specific UL-DL configuration for a specific serving cell is not identical with a transmission direction according to the reference UL-DL configuration, UE can designate the corresponding subframe as 'X' in which the corresponding subframe is not used.

In the case of UE that operates in full duplex in a carrier aggregation between cells in which different UL-DL configurations are used, a reference UL-DL configuration for uplink HARQ timing can be determined as follows.

For example, if UL subframes in the cell-specific UL-DL configuration of a secondary cell are a subset of UL subframes defined in the cell-specific UL-DL configuration of a primary cell, the reference UL-DL configuration of the secondary cell can become the UL-DL configuration of the primary cell. In this case, an UL subframe of the secondary cell that does not form an intersection with a valid UL subframe of the primary cell can become an invalid subframe.

For another example including the above example, an UL-DL configuration in which all DL subframes are included in a DL subframe intersection formed by the cell-specific UL-DL configuration of a secondary cell and by the cell-specific UL-DL configuration of a primary cell (i.e., a set of subframes that are DL subframes in the two serving cells) can become the reference UL-DL configuration of the secondary cell. Preferably, an UL-DL configuration in which the number of DL subframes is the largest as compared with UL subframes can be selected. In this case, subframes of the secondary cell that do not form an UL subframe intersection with the reference UL-DL configuration (i.e., a set of all subframes configured to be UL subframes in the cell-specific UL-DL configuration and the reference UL-DL configuration) can become invalid subframes.

In the case of UE that operates in half duplex in a carrier aggregation between cells in which different UL-DL configurations are used, a reference UL-DL configuration for uplink HARQ timing can be determined as follows.

For example, if UL subframes in the cell-specific UL-DL configuration of a secondary cell are a subset of UL subframes defined in the cell-specific UL-DL configuration of a primary cell, the reference UL-DL configuration of the secondary cell can become the UL-DL configuration of the primary cell. In this case, an UL subframe of the secondary cell that does not form an intersection with a valid UL subframe of the primary cell becomes an invalid subframe. Here, the UL subframe does not become an X subframe.

For another example including the above examples, like in the case of full duplex, an UL-DL configuration in which all DL subframes are included in the DL subframe intersection of the cell-specific UL-DL configuration of a secondary cell and the cell-specific UL-DL configuration of a primary cell can be used as the reference UL-DL configuration of the secondary cell. Preferably, an UL-DL configuration in which the number of DL subframes is the greatest than the number of UL subframes can be selected. In this case, an UL subframe of the secondary cell that does not form an UL subframe intersection with the reference UL-DL configuration becomes an invalid subframe. Furthermore, if an X subframe is generated because cells aggregated with a cell-specific UL-DL configuration have different transmission directions, the X subframe can become an invalid subframe.

Figure 20:
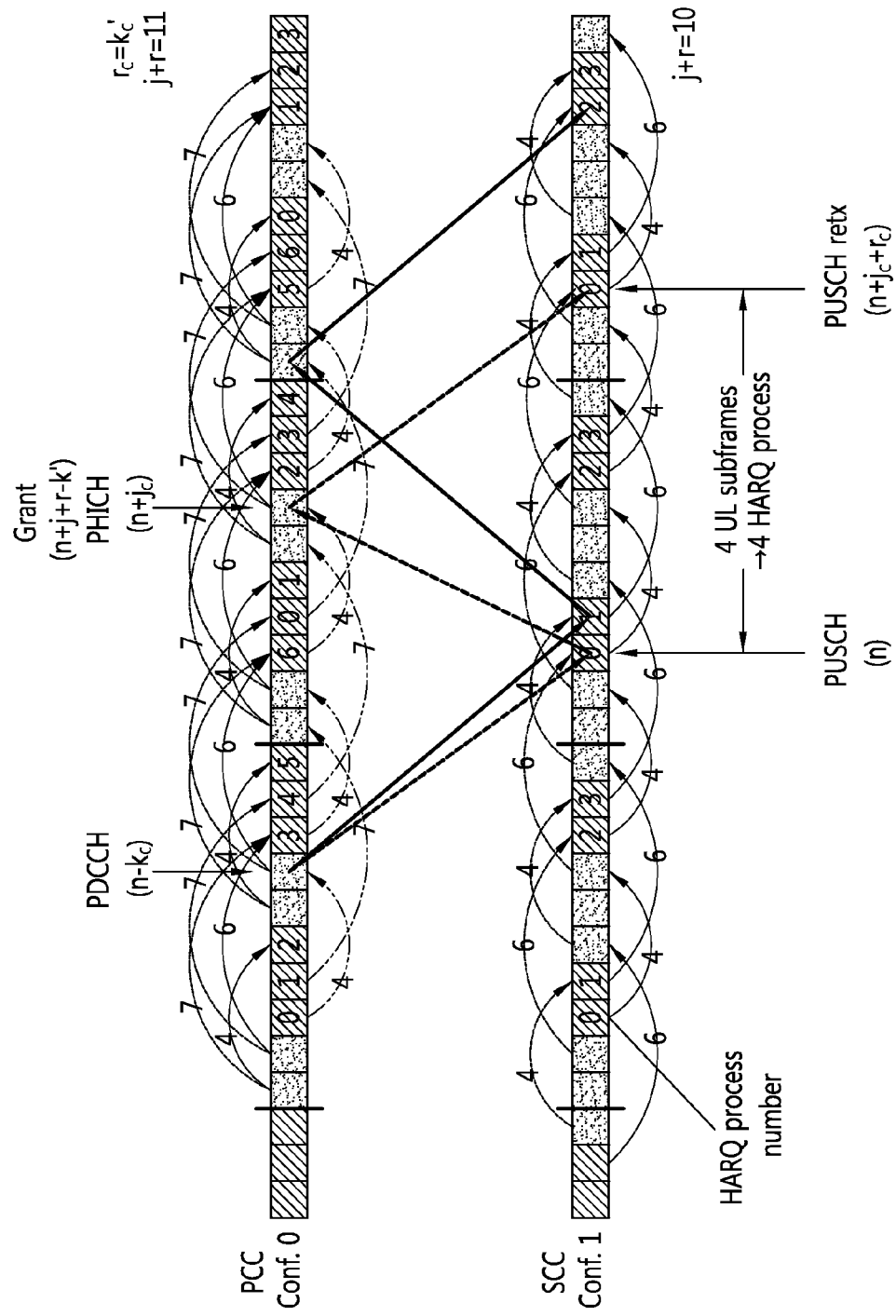
FIG. 20 shows a problem in a process of performing a synchronous HARQ when each serving cell uses a different UL-DL configuration.

FIG. 20 shows a problem in a process of performing a synchronous HARQ when each serving cell uses a different UL-DL configuration.

Referring to FIG. 20, a primary cell uses an UL-DL configuration 0, and a secondary cell uses an UL-DL configuration 1. Hereinafter, kc, jc, rc, kc', jc', and rc' indicate an HARQ timing relationship between a DL subframe of the primary cell and an UL subframe of the secondary cell when cross-carrier scheduling is used.

kc and jc can be configured to make the fastest response which satisfies $k_{min}$. If different UL-DL configurations are used, control information capable of distinguishing UL subframes needs to be included in an UL grant because one UL grant can schedule a plurality of UL subframes. Furthermore, from FIG. 20, it can be seen that HARQ process numbers of some HARQ processes are changed. In order to solve this problem, the following method can be used.

An HARQ process of a serving cell (a secondary cell, indicated by SCC) that is subject to cross-carrier scheduling can switch to an asynchronous HARQ process not to a synchronous HARQ process. To this end, information that informs an HARQ process number can be included in a DCI format for scheduling the secondary cell. The HARQ process number may be known by using some fields of the DCI format and may be known by adding a new field.

If the length of a DCI format for scheduling a primary cell is different from that of a DCI format for scheduling a secondary cell, blind decoding overhead for UE can be increased. Accordingly, it is preferred that the lengths of the two DCI formats be made the same. To this end, if a field indicative of an HARQ process number is added to the DCI format for scheduling the secondary cell, a field indicative of an HARQ process number can be added to the DCI format for scheduling the primary cell. The field indicative of the HARQ process number that is added to the DCI format for scheduling the primary cell can be used for an asynchronous HARQ process in the primary cell. Alternatively, the synchronous HARQ process is maintained in the primary cell, but the field indicative of the HARQ process number can be used for other purposes.

The method is not necessarily used upon cross-carrier scheduling and may be applied to the case where an UL subframe of each serving cell and a scheduling criterion for a DL subframe are changed upon non-cross-carrier scheduling.

Figure 21:
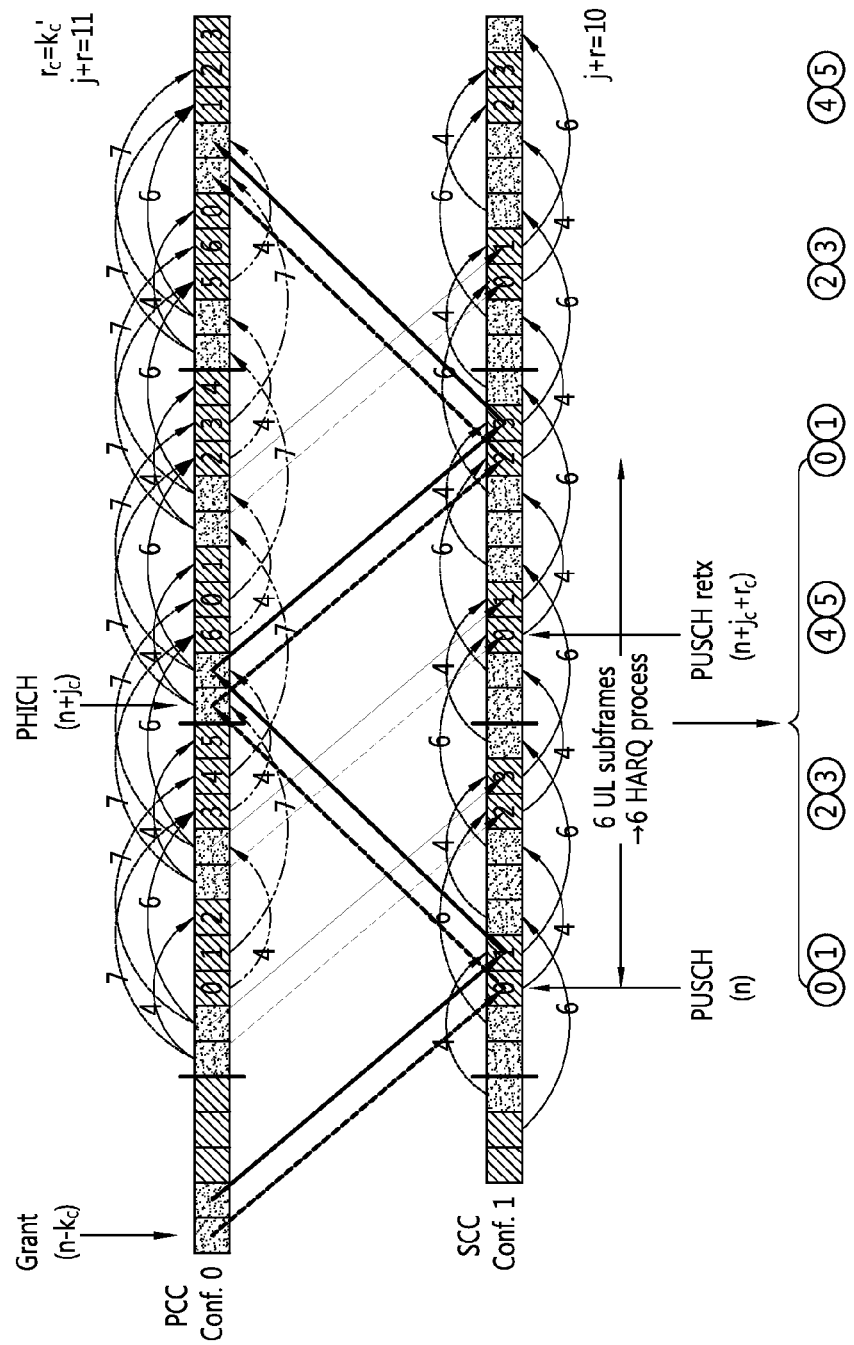
FIG. 21 shows a process of performing a synchronous HARQ when each serving cell uses a different UL-DL configuration.

FIG. 21 shows a process of performing a synchronous HARQ when each serving cell uses a different UL-DL configuration.

Referring to FIG. 21, UL grant transmission time points for different UL subframes of a secondary cell are configured to not overlap with each other, and the UL grant transmission time points are distributed so that the fastest response satisfying can be performed.

A secondary cell SCC operates as j+r=10 in the case of non-cross-carrier scheduling and operates as jc+rc=15 in the case of cross-carrier scheduling. In this case, all the HARQ processes of the secondary cell have different HARQ process numbers. In order to solve this problem, the number of HARQ processes can be increased.

That is, the number of HARQ processes of a secondary cell which are subject to cross-carrier scheduling can be configured to be the same as the number of UL subframes of the secondary cell (as illustrated in FIG. 21, one UL subframe of a start point and a retransmission time point is excluded from the number because a period is repeated) which are present up to the initial PUSCH transmission time point of the secondary cell and the PUSCH retransmission time point of a synchronous HARQ process for an ACK/NACK response through a PHICH (i.e., between the regression periods of the same HARQ process). As shown in the example of FIG. 21, the number of HARQ processes is 4 when operating as a single cell or at the time of non-cross-carrier scheduling. In the case of cross-carrier scheduling, however, since the regression period of the same HARQ process is changed, the number of UL subframes (Here, an UL subframe in which a PUSCH is retransmitted is excluded from the number of UL subframes) including the UL subframe of an initial PUSCH transmission time point up to a PUSCH retransmission time point becomes 6. As a result, the number of HARQ processes becomes 6. Here, the number of UL subframes can be limited to the number of valid UL subframes. That is, although a subframe is configured to be an UL subframe according to a cell-specific UL-DL configuration, UE cannot use the UL subframe if the transmission of a control channel (PDCCH) for scheduling the data channel (PUSCH) of the UL subframe is not defined in a scheduling cell. Furthermore, if some subframes are configured to be DL subframes according to the UL-DL configuration of each serving cell, UE operating in half duplex cannot use the corresponding subframes. Accordingly, the number of HARQ processes can be configured to be the same as the number of valid UL subframes not including the invalid UL subframes. The number of HARQ processes determined by taking cross-carrier scheduling into consideration as described above can also be applied to the number of HARQ processes upon non-cross-carrier scheduling for the simplicity of a UE implementation.

As another method, in the case of a carrier aggregation between cells in which different UL-DL configurations are used or a carrier aggregation using different duplex methods (i.e., an aggregation of a carrier using FDD and a carrier using TDD), an agreed value can be used as the number of HARQ processes, or a BS can determine the number of HARQ processes and inform UE of the number of HARQ processes through signaling. The signaling can be performed through an RRC message. This can be applied to only the number of HARQ processes of a secondary cell which are subject to cross-carrier scheduling. Here, a cell subject to non-cross-carrier scheduling uses the number of HARQ processes that is defined in a corresponding UL-DL configuration of a corresponding duplex method. This method can be used to determine the number of downlink HARQ processes as well as the number of uplink HARQ processes.

Figure 22:
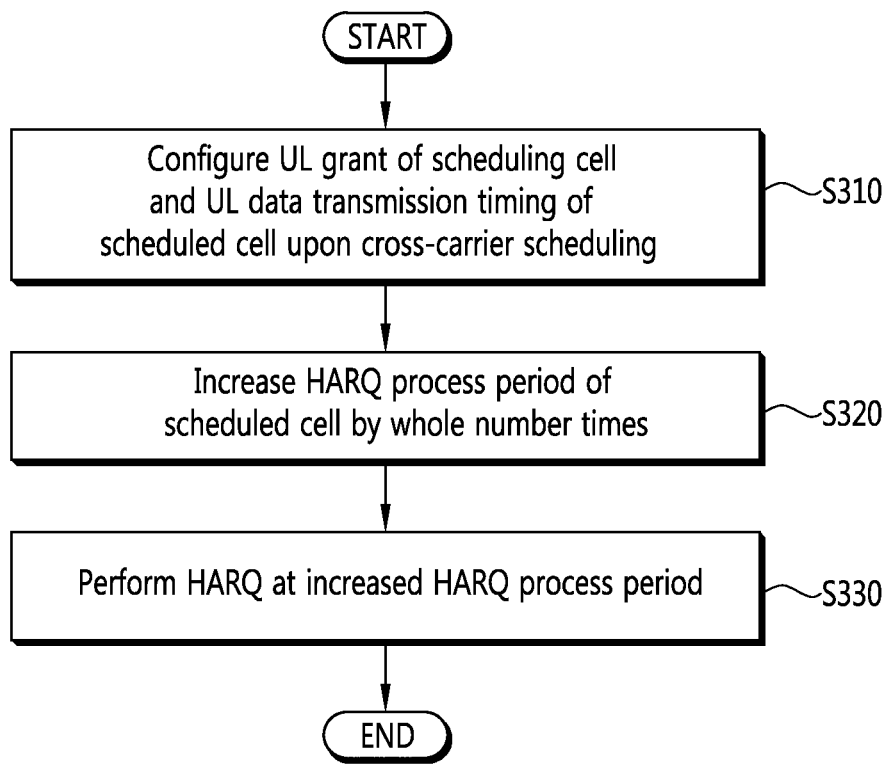
FIG. 22 shows a process of performing a synchronous HARQ when each serving cell uses a different UL-DL configuration.

FIG. 22 shows a process of performing a synchronous HARQ when each serving cell uses a different UL-DL configuration.

The UL grant of a scheduling cell and UL data transmission timing of a scheduled cell are configured upon cross-carrier scheduling (S310). The scheduling cell can be a primary cell, and the scheduled cell can be a secondary cell.

A BS increases the HARQ process period of the scheduled cell by a whole number times the HARQ period in the case where one serving cell is allocated to UE (S320). Here, the HARQ process period means a subframe interval between a subframe in which UL data is transmitted and a subframe right before a subframe in which the UL data is retransmitted or new UL data is transmitted. The HARQ process period is also called an HARQ period and may also be called an HARQ regression period.

The BS performs an HARQ at the increased HARQ process period along with the UE (S330).

Figure 23:
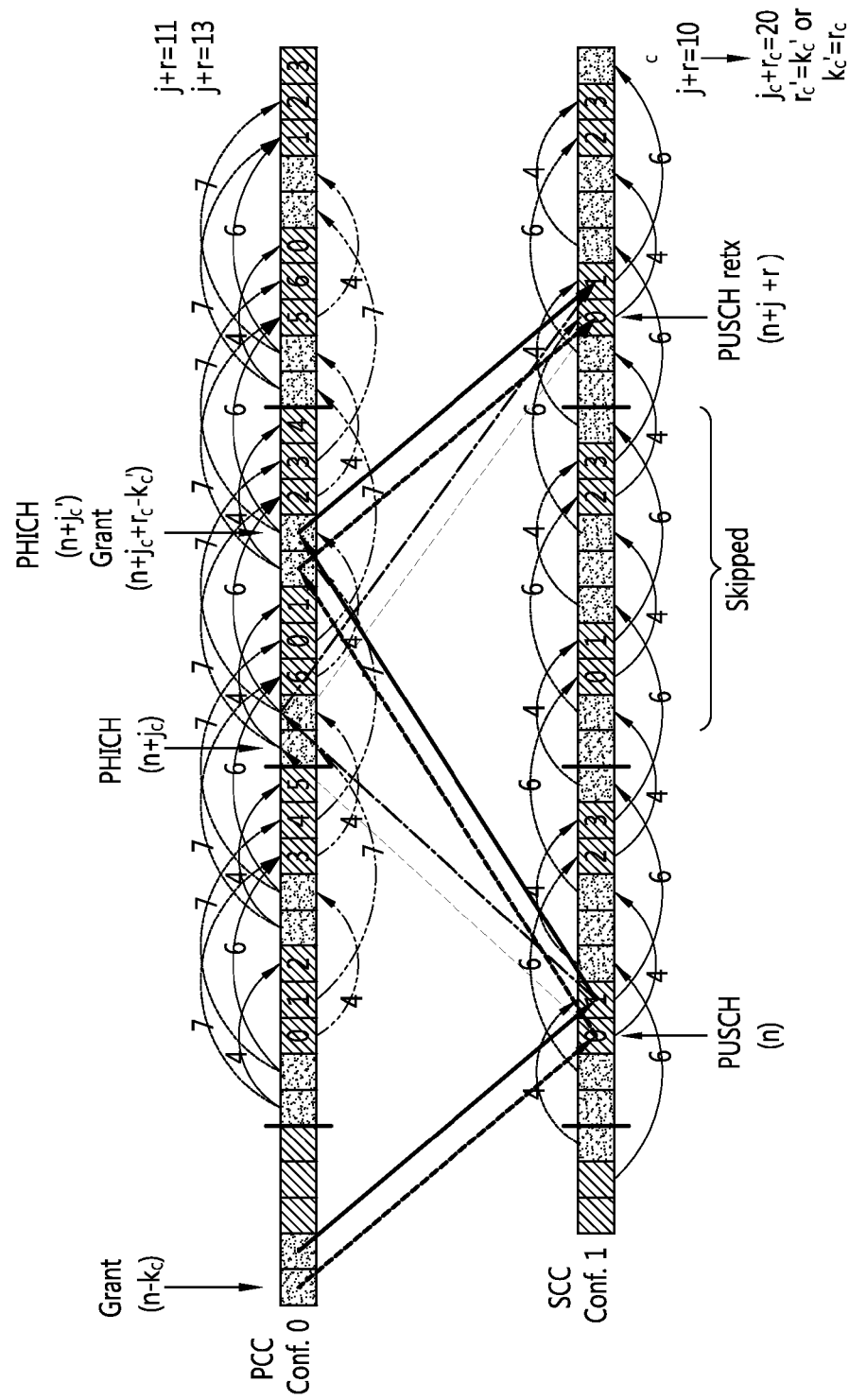
FIG. 23 shows HARQ timing when the method of FIG. 22 is used.

FIG. 23 shows HARQ timing when the method of FIG. 22 is used.

Referring to FIG. 23, an UL-DL configuration 0 is used in a primary cell, and an UL-DL configuration 1 is used in a secondary cell. UE receives an UL grant for an UL subframe of the secondary cell through the primary cell (grant(n−kc)) and sends UL data in the UL subframe of the secondary cell based on the UL grant (PUSCH(n)). If an acknowledgment/not-acknowledgement (ACK/NACK) signal for the UL data is received through a PHICH through the primary cell (PHICH(n+jc)) and the ACK/NACK signal is NACK, the UE sends retransmission data for the UL data in the UL subframe of the secondary cell (PUSCH retx(n+jc+rc)). Here, an interval between the UL data transmission and the UL data retransmission, that is, the HARQ period, is a whole number times the HARQ period in the case where one serving cell is allocated to the UE. That is, if non-cross-carrier scheduling is used in the secondary cell, j+r=10. In contrast, if cross-carrier scheduling is used in the secondary cell, jc+rc=20. That is, the HARQ process period of the secondary cell is doubled.

If cross-carrier scheduling is used, PHICH response timing can be configured (jc) with minimum delay as indicated by a dotted line in FIG. 23, and an rc value is set in PUSCH retransmission therefor so that the rc value is mapped to the same HARQ process as that applied in a single serving cell.

Here, some UL subframes of the secondary cell can be skipped without being used in HARQ processes allocated to the corresponding UL subframes. That is, some UL subframes of the secondary cell are not used in non-adaptive-synchronous HARQ process retransmission that responds to a PHICH without an UL grant.

If an UL grant for an HARQ process number between PUSCH initial transmission (indicated by PUSCH(n)) and PUSCH retransmission (indicated by PUSCH retx (n+jc+rc)) that have the same HARQ process number (e.g., 0) is present, retransmission or new PUSCH transmission can be stated irrespective of the PHICH response.

Alternatively, a limit may be applied to an UL grant for an HARQ process number between the PUSCH initial transmission (indicated by PUSCH(n)) and the PUSCH retransmission (indicated by PUSCH retx (n+jc+rc)) that have the same HARQ process number (e.g., 0) so that the UL grant is not transmitted. In this case, UE may not search for the UL grant on condition that the limited UL grant is not transmitted.

In FIG. 23, if an HARQ process is to be allocated in skipped subframes, HARQ processes having the same number as the number of UL subframes of a secondary cell which are present between the initial PUSCH transmission time point of the secondary cell and the PUSCH retransmission time point of a synchronous HARQ process for an ACK/NACK response through a PHICH can be allocated. In this example, if HARQ processes operate as a single cell, the number of HARQ processes is 4, but the number of HARQ processes is doubled to become 8 in the case of cross-carrier scheduling. In this case, the number of UL subframes between the initial PUSCH transmission time point and the PUSCH retransmission time point can be limited to the number of valid UL subframes. If a retransmission PUSCH is transmitted in n+jc+rc', a BS can send an UL grant for the retransmission PUSCH in n+jc+rc-kc'.

Alternatively, if the retransmission PUSCH is transmitted in n+jc+rc, the BS can send the UL grant for the retransmission PUSCH in n+jc. That is, the BS can send the UL grant at the same time point as a time point at which a PHICH for the initial PUSCH transmission is transmitted.

Alternatively, in cross-carrier scheduling, PUSCH retransmission may be mapped to the same HARQ process as that of the case where minimum delay (jc+rc) and a single serving cell are configured, and PHICH transmission timing n+jc' may be configured to be the same as timing at which an UL grant for the retransmission PUSCH is transmitted, that is, n+jc+rc-kc', not as PHICH timing configured with minimum delay (i.e., jc). In this case, rc'=kc'.

Figure 24:
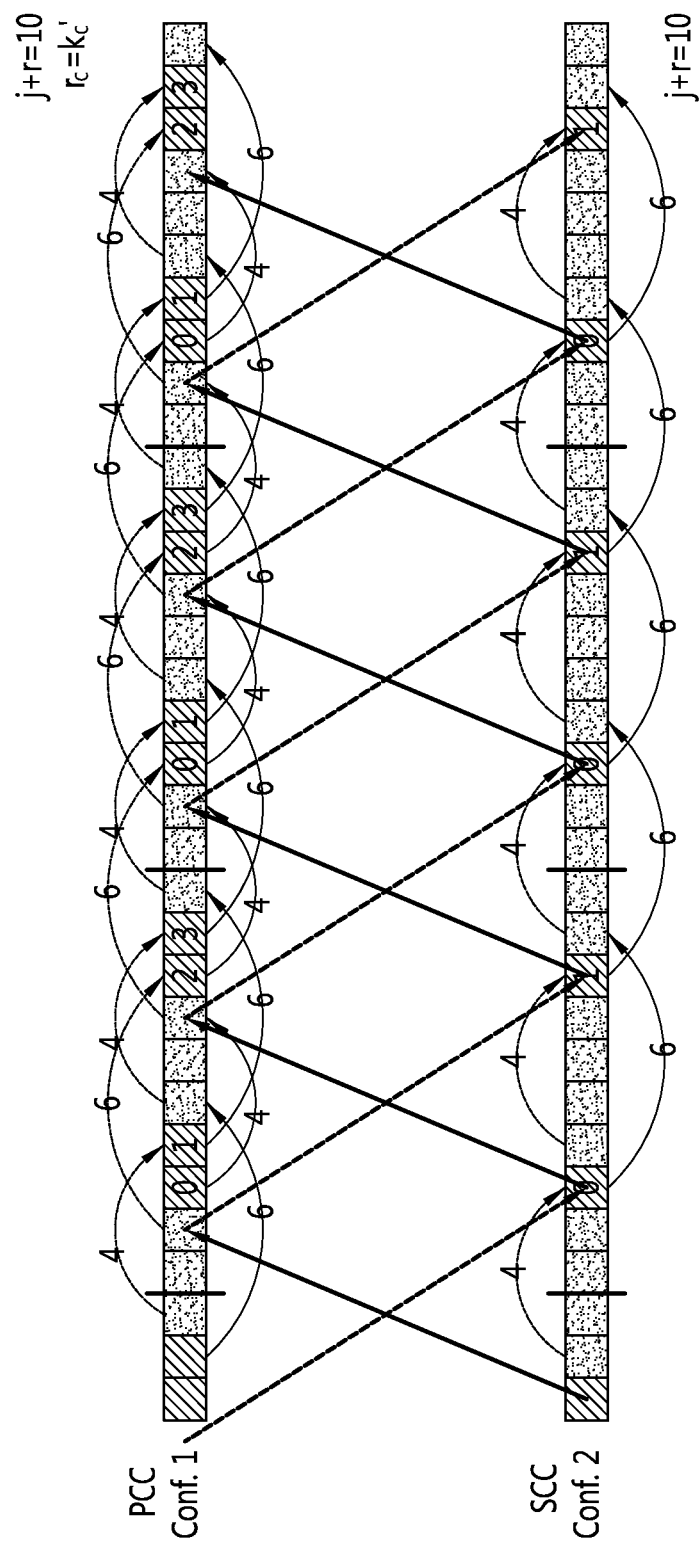
FIGS. 24 and 25 show examples in which the number of HARQ processes is made identical with an HARQ process period by equally distributing UL grants and PHICH transmission time points.
Figure 25:
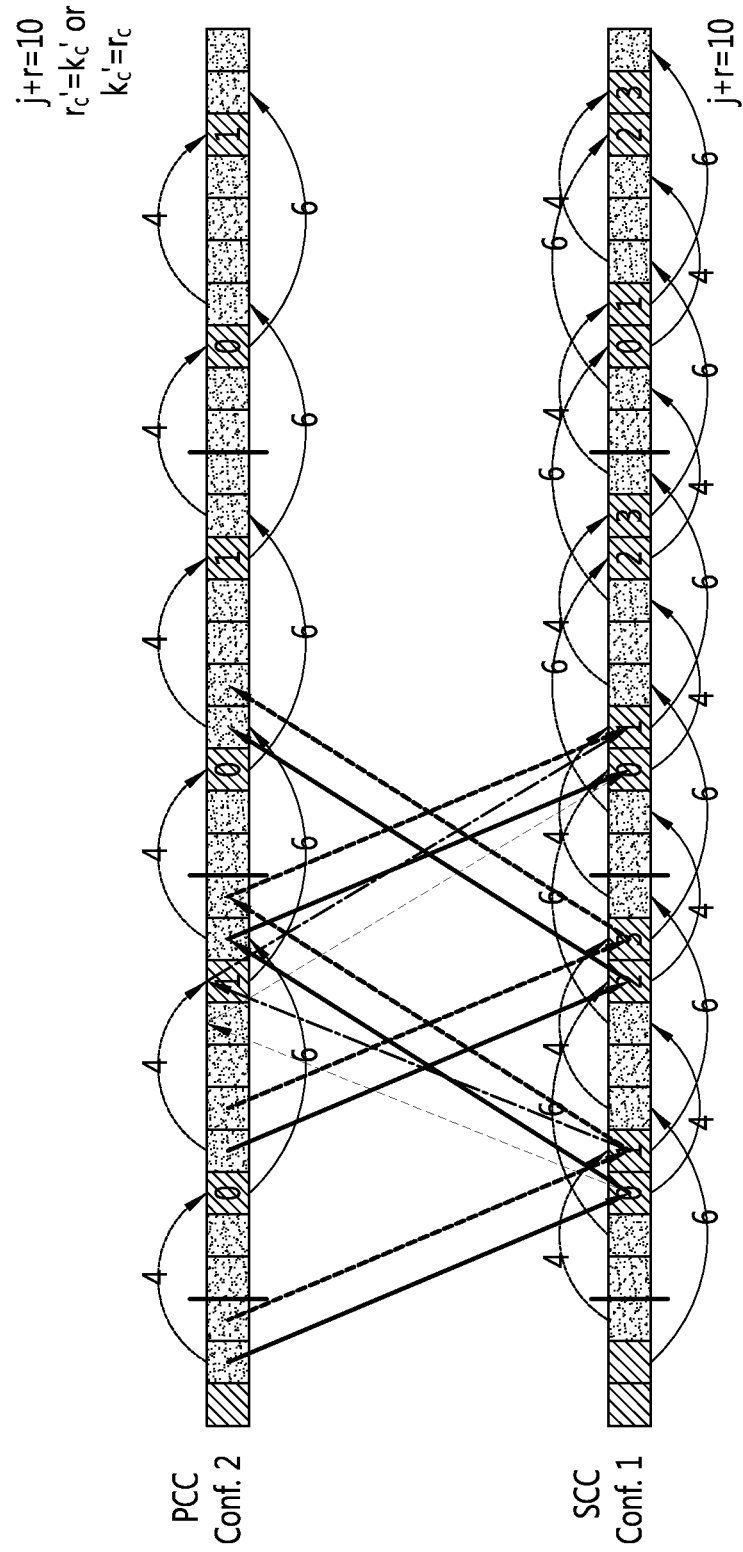

FIGS. 24 and 25 show examples in which the number of HARQ processes is made identical with an HARQ process period by equally distributing UL grants and PHICH transmission time points.

That is, the examples of FIGS. 24 and 25 correspond to the case where the number of HARQ processes is identical with a period in the case where a single serving cell is configured and the case where a plurality of serving cells is configured and cross-carrier scheduling is used.

To this end, if a single serving cell is configured, an aggregation between serving cells that include UL-DL configurations having the same HARQ process period (j+r) can be allowed. That is, a carrier aggregation is allowed between serving cells having UL-DL configurations 1, 2, 3, 4, and 5 wherein j+r=10.

Furthermore, an UL grant for a PUSCH can be transmitted at the same timing irrespective of whether the PUSCH is initially transmitted or retransmitted. Here, PHICH transmission timing on which whether or not the PUSCH corresponds to non-adaptive-synchronous HARQ retransmission can be made identical with the timing of the UL grant.

Figure 26:
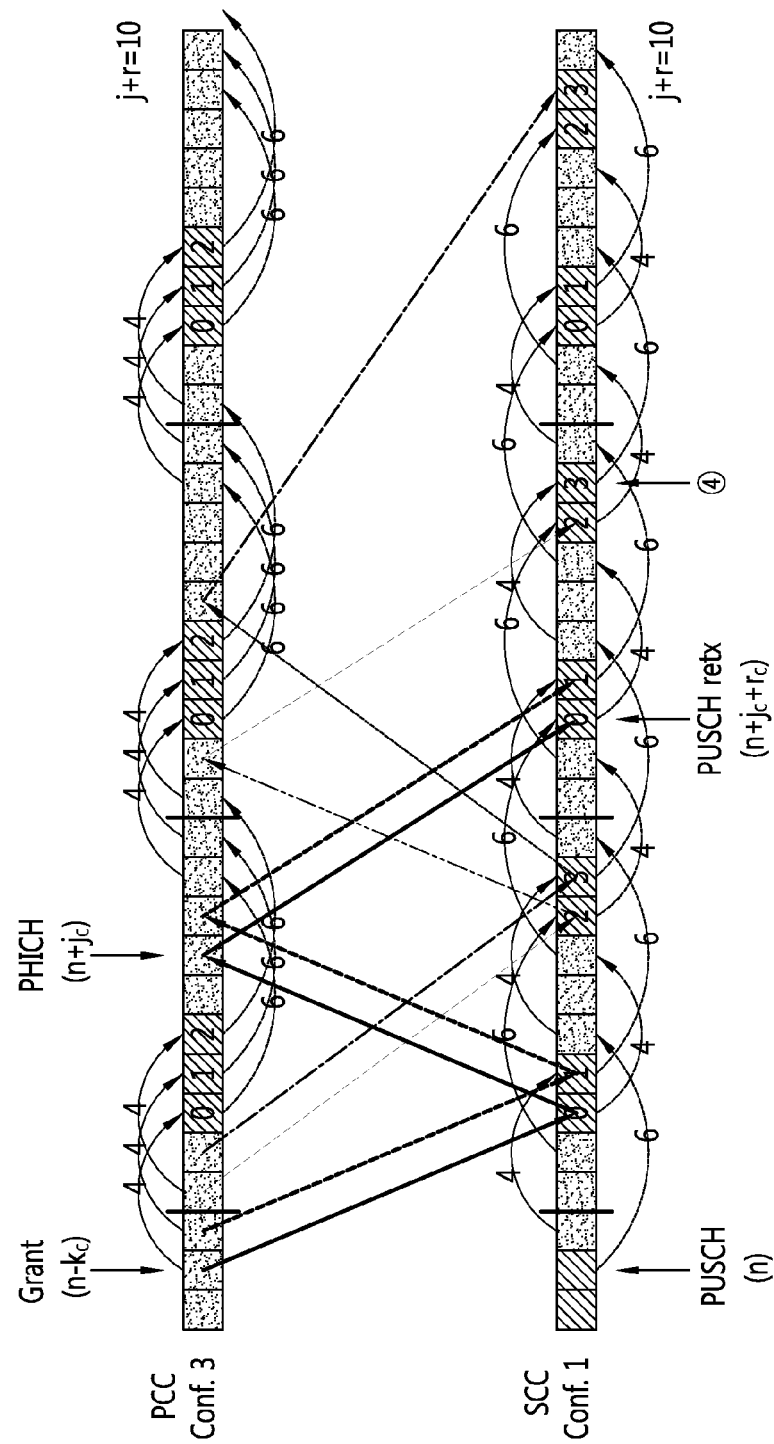
FIG. 26 shows a problem that may occur when serving cells in which an UL-DL configuration having the same j+r value is used are aggregated.

FIG. 26 shows a problem that may occur when serving cells in which an UL-DL configuration having the same j+r value is used are aggregated.

From FIG. 26, it can be seen that a PUSCH is retransmitted with a periodic interval of 10 subframes in the HARQ processes 0, 1, and 2 of a secondary cell. However, the retransmission period of the HARQ process 3 is not the 10 subframes. Even when serving cells in which an UL-DL configuration having the same j+r value is used are aggregated, the HARQ periods of some HARQ processes may not be constant.

In order to solve this problem, the following methods can be used.

1) An UL subframe not matched with an HARQ period as in the HARQ process 3 may be excluded from PUSCH transmission.

2) If a subframe is not matched with an HARQ period as in the HARQ process 3, the subframe can be retransmitted in a next period. That is, this method is a method of increasing an HARQ period. UL subframes that are halfway skipped due to the increased HARQ period can be allocated to another HARQ process. The number of additionally allocated HARQ processes is dependent on the increased HARQ period. That is, when an HARQ period is increased N times, the number of additionally allocated HARQ processes becomes N−1. For example, in FIG. 26, if the HARQ period of the HARQ process 3 is doubled, an HARQ process 4 can be allocated to one UL subframe that is halfway skipped. In this case, the HARQ processes 0, 1, and 2 and the HARQ process 3 have different HARQ periods.

In UL subframes to which an HARQ process is added, the number of added HARQ processes and/or an HARQ process period may be differently configured every UL subframe or UL subframe group, and an agreed value or a value signaled through RRC can be used as the number of added HARQ processes and/or an HARQ process period.

3) Method of changing the number of HARQ processes.

Figure 27:
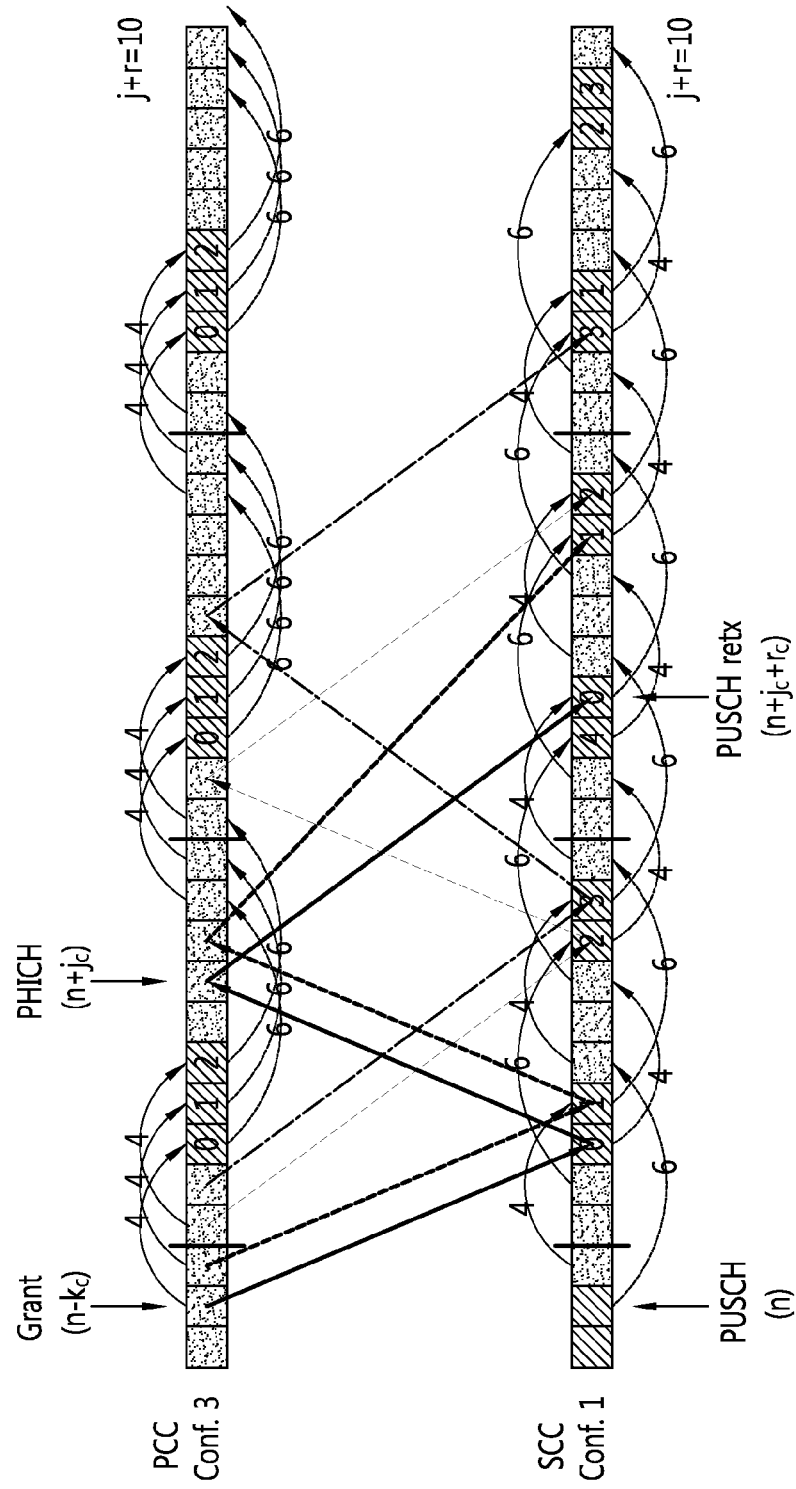
FIG. 27 shows a method of changing the number of HARQ processes.

FIG. 27 shows a method of changing the number of HARQ processes.

Referring to FIG. 27, in this method, in timing configured to have a response having minimum delay, the same HARQ process is configured in a pair of UL subframes having a maximum jc+rc, and the number of HARQ processes is determined depending on the number of UL subframes that are present between the same HARQ processes.

In the case of a secondary cell, the number of HARQ processes is 4 if a single serving cell is configured, but is 5 as in FIG. 27 if a plurality of serving cells is configured.

An agreed value can be used as the number of HARQ processes that are subject to cross-carrier scheduling, or a BS can determine the number of HARQ processes and inform UE of the number of HARQ processes through signaling using an RRC message.

4) Method of excluding PUSCH transmission having UL grant timing for a retransmission PUSCH, which is not identical with PHICH transmission timing.

Figure 28:
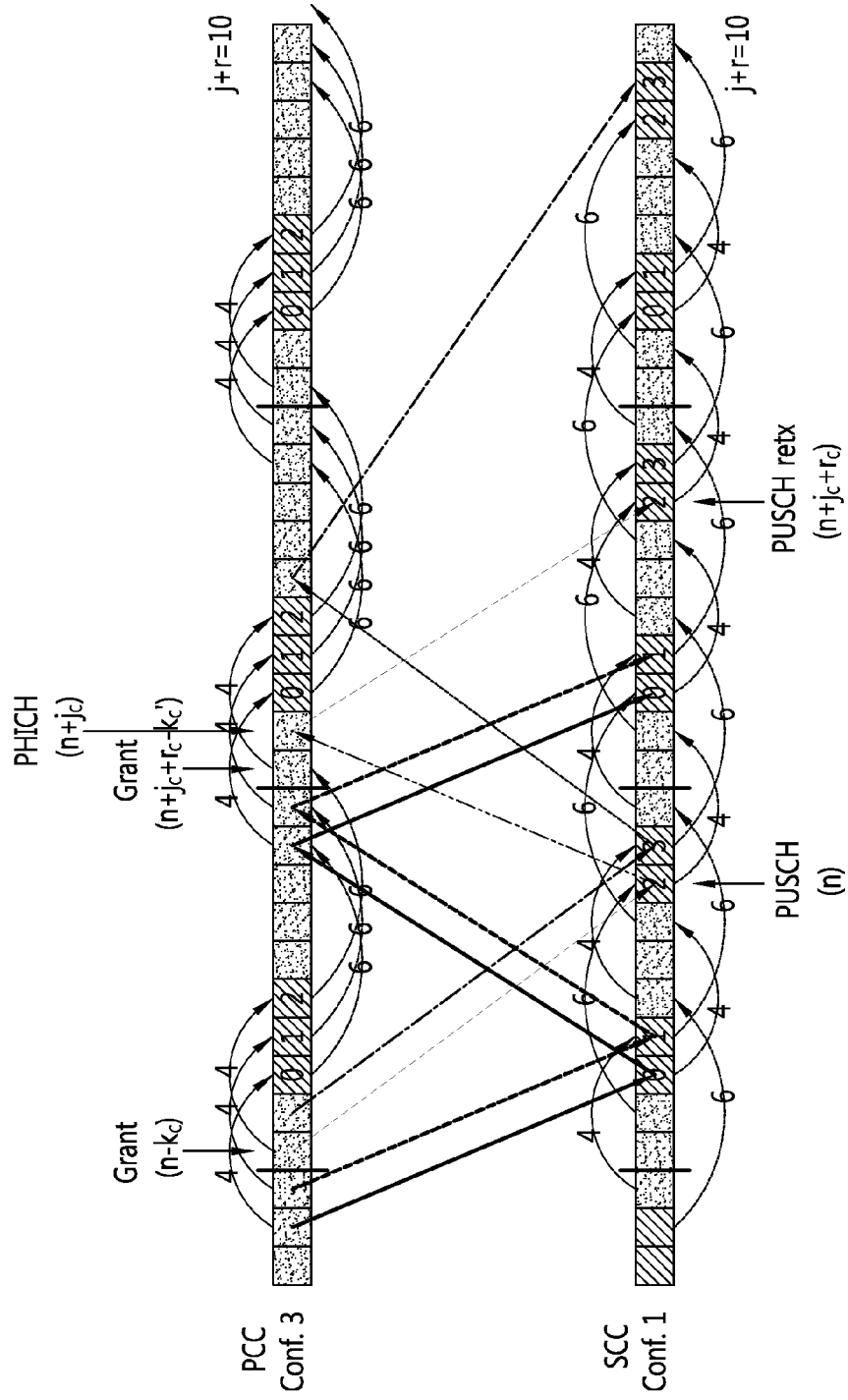
FIG. 28 shows the method 4).

FIG. 28 shows the method 4).

Referring to FIG. 28, in PHICH timing and retransmission UL grant timing, the HARQ processes 0 and 1 of a secondary cell have the same timing, but the HARQ processes 2 and 3 thereof do not have the same timing. In this case, PUSCH transmission in UL subframe in which the HARQ processes 2 and 3 are performed is excluded. That is, in FIG. 28, in the TDD frame of the secondary cell, third and fourth subframes are used in UL PUSCH transmission, and eighth and ninth subframes are not used.

5) Method of matching PHICH transmission timing with UL grant timing for a retransmitted PUSCH by shifting the frame boundaries of a primary cell and a secondary cell.

Figure 29:
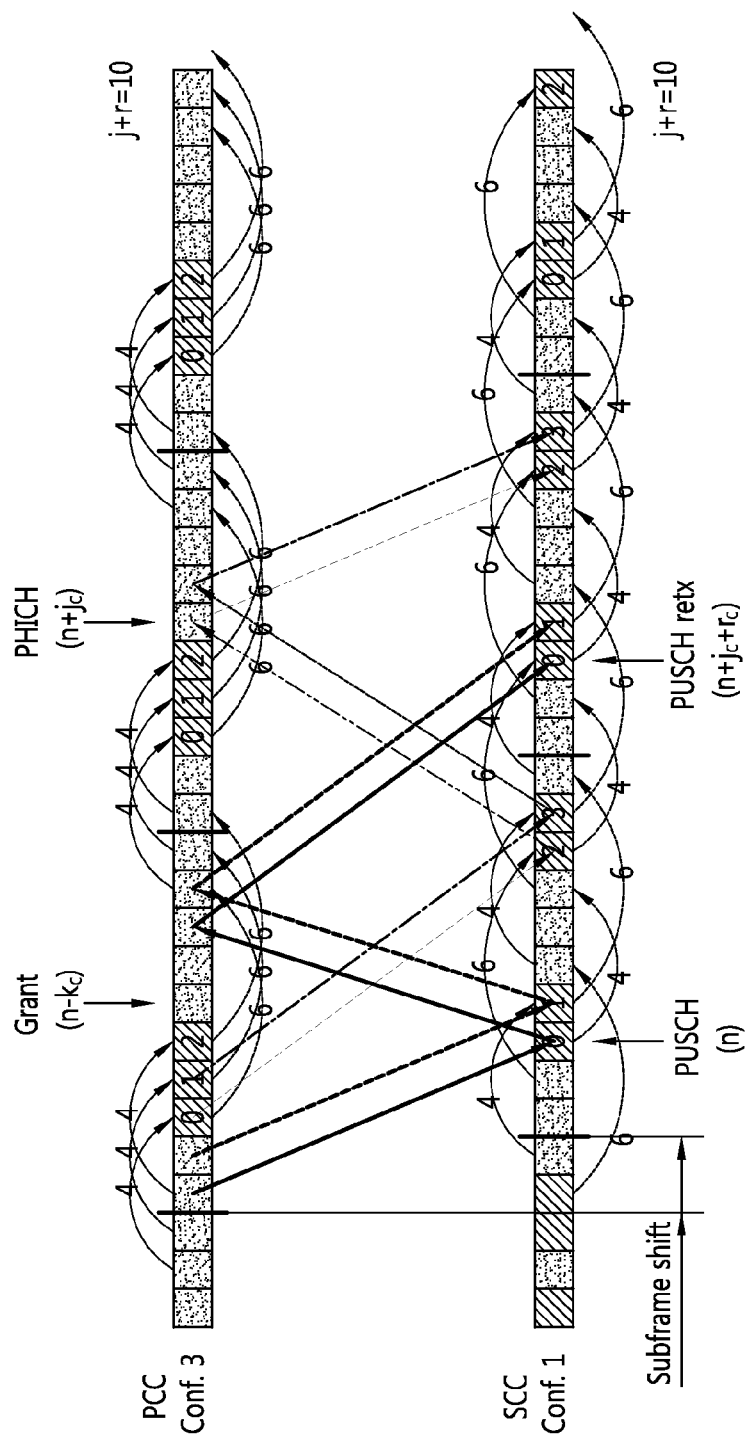
FIG. 29 shows a method of performing an HARQ according to the method 5).

FIG. 29 shows a method of performing an HARQ according to the method 5).

Referring to FIG. 29, the frame boundaries of a plurality of serving cells configured in UE can be shifted by the subframe without matching the frame boundaries with each other. A shifted value is a value on which the HARQ process periods of all the UL subframes of a secondary cell are maintained. Furthermore, PHICH transmission timing can be matched with UL grant transmission timing for a retransmission PUSCH. An agreed and fixed value can be used as the shift value having the subframe unit, or a BS can inform UE of the shift value through signaling using an RRC message.

Meanwhile, in an UL-DL configuration, DL-UL switch-point periodicity can be 5 ms or 10 ms. In a similar channel environment, there is a good possibility that the same DL-UL switch-point periodicity may be used, and UL-DL configurations having the same switch-point periodicity have a similar timing relationship. Furthermore, in the case of UE that supports half duplex, there is a problem in that an S subframe needs to be added if serving cells having UL-DL configurations having DL-UL switch-point periodicity with different periods are aggregated.

Accordingly, a method of allowing only a carrier aggregation between serving cells having UL-DL configurations having the same DL-UL switch-point periodicity may be taken into consideration. That is, an aggregation may be allowed between serving cells having a 5 ms period, or an aggregation may be allowed only between serving cells having a 10 ms period.

The above-described methods can be used in combination. Furthermore, the methods do not need to be necessarily used in a carrier aggregation system. For example, the above-described methods can be used when an UL grant and PHICH transmission are configured only in a specific DL subframe of one carrier (one TDD serving cell) and a timing relationship with a PUSCH in the same carrier is set up.

Figure 30:
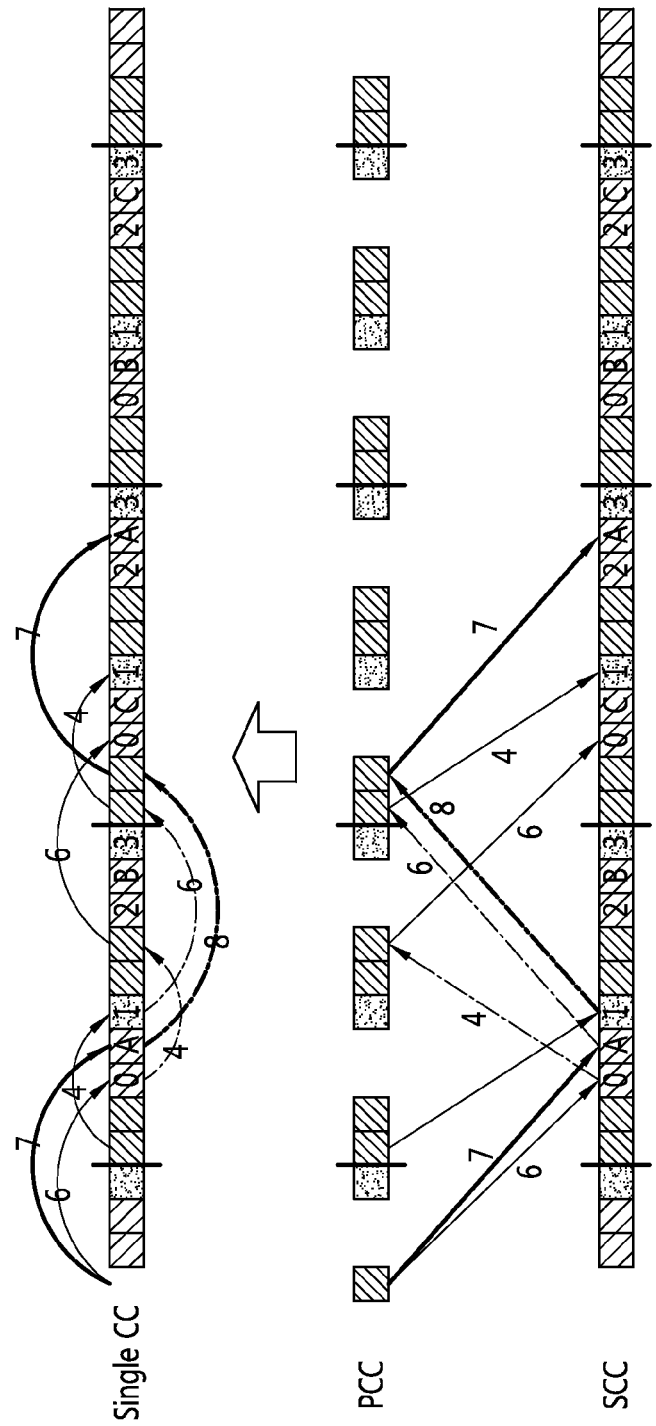
FIG. 30 shows an example in which the present invention is applied to a single serving cell.

FIG. 30 shows an example in which the present invention is applied to a single serving cell.

Referring to FIG. 30, the subframes of a primary cell include a DL subframe (this is indicated by default DL), an UL subframe (this is indicated by default UL), and a flexible UL/DL subframe (this is indicated by flexible UL/DL). The DL subframe includes a PDCCH region. The flexible UL/DL subframe is a subframe which can be used as an UL subframe or a DL subframe. If a plurality of serving cells is configured, the DL subframe of a primary cell can be replaced with a specific DL subframe that is configured to enable UL grant and PHICH transmission in a single cell.

Meanwhile, in a timing relationship between the PHICH of a primary cell and the PUSCH of a secondary cell, PHICH resources may not be configured in the primary cell. This is because there is a DL subframe not having mapping between the PUSCH and the PHICH in a single carrier condition in which only the primary cell has been configured. In this case, a synchronous HARQ process operation can be performed as follows.

If PHICH resources are not present in the DL subframe of a PHICH transmission carrier (this is called CC_h) corresponding to the UL subframe of a carrier (this is called CC_s) through which a PUSCH is transmitted, PHICH transmission may not be performed.

Furthermore, a PUSCH retransmission UL subframe corresponding to PHICH timing, a non-adaptive-synchronous HARQ process of performing an automatic retransmission operation based on a response to the PHICH without an UL grant may not be allowed.

If a retransmission is needed in a corresponding HARQ process, an adaptive synchronous HARQ process, where a retransmission is performed by an UL grant, can be performed.

For example, UE has transmitted UL data in the first UL subframe of a secondary cell, but it may be difficult to allocate PHICH resources to a DL subframe of a corresponding primary cell. In this case, a BS does not transmit ACK/NACK for the UL data through a PHICH. Instead, the BS can transmit an UL grant for scheduling the second UL subframe of the secondary cell. For a PUSCH to be retransmitted according to the corresponding PHICH timing, the UL grant includes information indicating whether or not the UL data will be retransmitted. For example, an existing New Data Indicator (NDI) bit can be used, or a new field indicating whether or not to perform retransmission can be added and transmitted.

The reason why a DL subframe in which PHICH resources are not configured is present in the DL subframes of a primary cell is that a DL subframe not having mapping between a PUSCH and a PHICH is present in a single carrier condition in which only a primary cell has been configured as described above. The DL subframe not having the mapping includes DL subframes indicated by D in the following table.

TABLE 9

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | |
| 1 | | D | | | | D | | | | |
| 2 | | D | D | | D | D | D | | | D |
| 3 | | | D | | | | D | D | D | |
| 4 | | D | D | | D | D | D | D | | |
| 5 | | D | D | D | D | D | D | D | | D |
| 6 | | | | | | | | | | |

UE does not attempt to receive a PHICH in a subframe (subframe indicated by D) in which a PHICH has not been configured. Regarding the PUSCH to be retransmitted according to the PHICH timing of the subframe, UE can determine whether or not to perform UL data retransmission based on whether or not a New Data Indicator (NDI) bit included in an UL grant has been toggled (e.g., the UE determines that UL data retransmission has not been instructed if the NDI bit has been toggled and determines that UL data retransmission has been instructed if the NDI bit has not been toggled). If, as a result of the determination, it is determined that UL data retransmission has not been instructed, the UE has only to send new data in a second UL subframe based on the UL grant. If, as a result of the determination, it is determined that UL data retransmission has been instructed, the UE has only to retransmit the UL data in the second UL subframe. Here, the UE can adaptively retransmit the UL data using a Modulation and Coding Scheme (MCS), transmission power, etc. which are different from those in initial UL transmission in a first UL subframe, based on the UL grant.

A method of stopping non-adaptive-synchronous HARQ retransmission as described above can be used only when there is no PHICH in the DL subframe of a PHICH transmission carrier CC_h that corresponds to the PUSCH transmission UL subframe of a PUSCH transmission carrier CC_s.

Alternatively, if there is no PHICH in any of the DL subframes of a PHICH transmission carrier CC_h corresponding to the PUSCH transmission UL subframes of a PUSCH transmission carrier CC_s, the methods can be applied to all the PUSCHs of the corresponding PUSCH transmission carrier CC_s.

Alternatively, the methods can be applied to all PUSCH transmission carriers CC_s irrespective of a DL subframe not having a PHICH. Exceptionally, the methods can be applied to only a secondary cell except a primary cell. Any one of the three methods can be used, or any one of the three methods can be selected in response to an RRC message.

A PHICH transmission carrier CC_h is the same as a carrier in which a PDCCH for scheduling a PUSCH is transmitted, and a PUSCH transmission carrier CC_s is a carrier in which the PUSCH is transmitted. In the case of cross-carrier scheduling, a PUSCH transmission carrier CC_s can become a secondary cell, and a PHICH transmission carrier CC_h can become a primary cell. In the case of non-cross-carrier scheduling, a PUSCH transmission carrier CC_s and a PHICH transmission carrier CC_h can become the same carrier.

If a PUSCH transmission carrier CC_s and a PHICH transmission carrier CC_h are the same and PHICH resources are not present, new timing generated due to a carrier aggregation of different UL-DL configurations can be used instead of PUSCH-PHICH timing that is defined in the UL-DL configuration of a corresponding carrier. The PHICH transmission carrier can be applied to only UE operating in half duplex.

Figure 31:
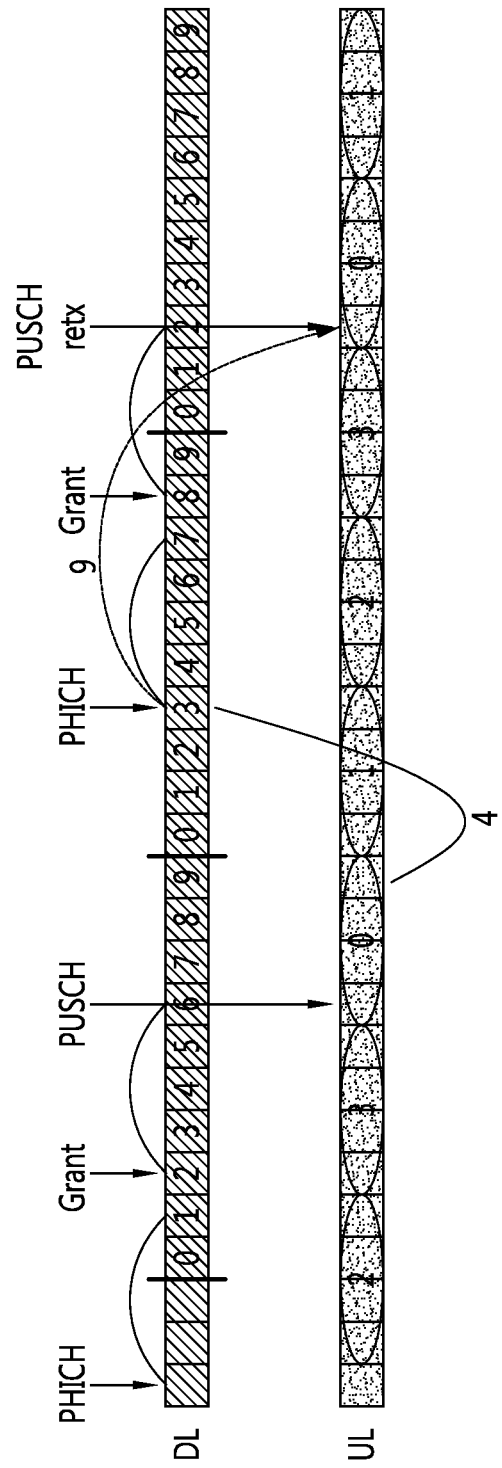
FIG. 31 shows HARQ timing according to subframe bundling in FDD.

FIG. 31 shows HARQ timing according to subframe bundling in FDD.

In FDD, subframe bundling refers to a scheme for increasing uplink cell coverage by repeatedly sending a PUSCH during several subframes. Even in this case, in order to guarantee $k_{min}$=4, configurations, such as the number of HARQ processes, UL grant timing, and PHICH timing, may be different from those in the case where subframe bundling is not used. Accordingly, when an aggregation between carriers that use different UL-DL configurations is performed, subframe bundling can be allowed only in a primary cell. Alternatively, subframe bundling can be allowed only in non-cross-carrier scheduling.

If a primary cell operates in FDD and a secondary cell operates in TDD, there is no timing restriction because UL transmission and DL reception are possible in all the subframes of the primary cell. Accordingly, the same HARQ timing as that of a single carrier configuration can be used. In this case, subframe bundling can be allowed even in the secondary cell.

All the above-described methods have been illustrated as being used on condition that a plurality of serving cells is aggregated, each of the serving cells uses a different UL-DL configuration, and cross-carrier scheduling is used, but not limited thereto. That is, the methods can be applied to the case where scheduling criteria for an UL subframe and a DL subframe are changed or the use of an UL subframe and a DL subframe is limited in a carrier using non-cross-carrier scheduling.

In accordance with the above-described methods, if a plurality of serving cells is an aggregated, each of the serving cells uses a different UL-DL configuration, and cross-carrier scheduling is used, retransmission timing according to a synchronous HARQ process can be effectively configured.

Figure 32:
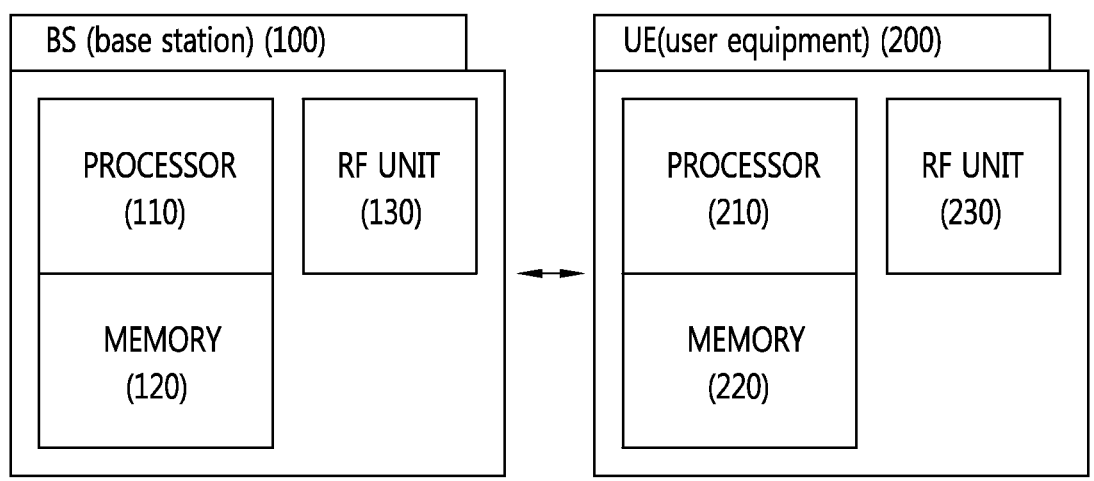
FIG. 32 is a block diagram showing a wireless apparatus in which an embodiment of the present invention is implemented.

FIG. 32 is a block diagram showing a wireless apparatus in which an embodiment of the present invention is implemented.

A BS 100 includes a processor 110, memory 120, and a Radio Frequency (RF) unit 130. The processor 110 implements the proposed functions, processes and/or methods. For example, the processor 110 sends an UL grant through a primary cell and receives UL data from UE through a secondary cell. Furthermore, the processor 110 sends ACK/NACK for the UL data through the primary cell and receives retransmitted UL data through the secondary cell. In this case, an interval between a time point at which the UL data is received and a time point at which the retransmitted UL data is received can be called an HARQ period. HARQ timing for determining the HARQ period has been described above. Furthermore, the processor 110 can include information indicative of whether or not to retransmit the ACK/NACK for the received UL data in the UL grant and send the UL grant, instead of sending the ACK/NACK for the received UL data through a PHICH. The memory 120 is connected with the processor 110, and it stores various pieces of information for driving the processor 110. The RF unit 130 is connected with the processor 110, and it transmits and/or receives radio signals.

UE 200 includes a processor 210, memory 220, and an RF unit 230. The processor 210 implements the proposed functions, processes and/or methods. For example, the processor 210 receives the UL grant of a secondary cell through a primary cell and sends UL data in a secondary cell based on the UL grant. Next, the processor 210 receives an acknowledgment/not-acknowledgement (ACK/NACK) signal for the UL data through the primary cell. If the ACK/NACK signal is NACK, the processor 210 sends retransmission data for the UL data in the secondary cell. As described above, a primary cell and a secondary cell use different UL-DL configurations. Furthermore, an HARQ period indicative of an interval between an UL data transmission time point and an UL data retransmission time point can be a whole number times the HARQ period in the case where one serving cell is allocated to UE. Furthermore, the processor 210 does not attempt to decode a PHICH in a specific DL subframe and determines whether or not to retransmit the UL data based on information indicating whether or not to retransmit the UL data, which is included in an UL grant. The specific DL subframe has been described above with reference to Table 9. The memory 220 is connected with the processor 210, and it stores various pieces of information for driving the processor 210. The RF unit 230 is connected with the processor 210, and it transmits and/or receives radio signals.

The processor 110, 210 may include Application-Specific Integrated Circuits (ASICs), other chipsets, logic circuits, data processors, and converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process or function) that performs the above function. The module may be stored in the memory 120, 220 and executed by the processor 110, 210. The memory 120, 220 may be placed inside or outside the processor 110, 210 and may be connected to the processor 110, 210 using a variety of well-known means Although some embodiments of the present invention have been described above, a person having ordinary skill in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

What is claimed is:

1. A method for performing a hybrid automatic repeat request (HARQ) by a user equipment (UE), the method comprising:
    receiving, through a first serving cell, an uplink (UL) grant for a first subframe of a second serving cell; and
    transmitting UL data in the first subframe of the second serving cell according to the UL grant,
    wherein when a not-acknowledgement (NACK) for the UL data is received through a physical HARQ indicator channel (PHICH) in a subframe i of the first serving cell, the UE performs a non-adaptive retransmission for the UL data in a second subframe of the second serving cell, and
    wherein when a PHICH resource corresponding to the UL data is not present in the subframe i, the UE does not perform the non-adaptive retransmission in the second subframe of the second serving cell.

2. The method of claim 1, wherein the UE is configured with a plurality of serving cells comprising the first serving cell and the second serving cell.

3. The method of claim 1, wherein the first serving cell and the second serving cell use different uplink-downlink (UL-DL) configurations, and each of the UL-DL configurations is information on which each subframe within a time division duplex (TDD) TDD frame is configured as a UL subframe, a DL subframe or a special subframe.

4. The method of claim 1, wherein if a UL grant for the second subframe is received through a physical downlink control channel (PDCCH) in the subframe i, the UE performs a transmission according to the UL grant for the second subframe.

5. The method of claim 4, wherein the UE performs a new transmission or a retransmission according the UL grant for the second subframe regardless of content of the PHICH in the subframe i.

6. A user equipment (UE), comprising:
    a Radio Frequency (RF) unit configured to transmit and receive radio signals; and
    a processor connected with the RF unit,
    wherein the processor is configured to:
        control the RF unit to receive, through a first serving cell, an uplink (UL) grant for a first subframe of a second serving cell, and
        control the RF unit to transmit UL data in the first subframe of the second serving cell according to the UL grant,
    wherein when a not-acknowledgement (NACK) for the UL data is received through a physical hybrid automatic repeat request (HARQ) indicator channel (PHICH) in a subframe i of the first serving cell, the UE performs a non-adaptive retransmission for the UL data in a second subframe of the second serving cell, and
    wherein when a PHICH resource corresponding to the UL data is not present in the subframe i, the UE does not perform the non-adaptive retransmission in the second subframe of the second serving cell.

7. The UE of claim 6, wherein the UE is configured with a plurality of serving cells comprising the first serving cell and the second serving cell.

8. The UE of claim 6, wherein the first serving cell and the second serving cell use different uplink-downlink (UL-DL) configurations, and each of the UL-DL configurations is information on which each subframe within a time division duplex (TDD) frame is configured as a UL subframe, a DL subframe or a special subframe.

9. The UE of claim 6, wherein if a UL grant for the second subframe is received through a physical downlink control channel (PDCCH) in the subframe i, the UE performs a transmission according to the UL grant for the second subframe.

10. The UE of claim 9, wherein the UE performs a new transmission or a retransmission according the UL grant for the second subframe regardless of content of the PHICH in the subframe i.

* * * * *